(12) United States Patent
Strehlau et al.

(10) Patent No.: US 12,343,707 B2
(45) Date of Patent: *Jul. 1, 2025

(54) CATALYST ARTICLE HAVING HIGH LOCAL RHODIUM CONCENTRATION

(71) Applicant: Johnson Matthey Public Limited Company, London (GB)

(72) Inventors: Wolfgang Strehlau, Bangkok (TH); Dongxia Liu, Wayne, PA (US); Andrew Armitage, Royston (GB); Amy Kolpin, Reading (GB); Michael Howard, Wayne, PA (US)

(73) Assignee: Johnson Matthey Public Limited Company, London (GB)

( * ) Notice: Subject to any disclaimer, the term of this patent is extended or adjusted under 35 U.S.C. 154(b) by 228 days.

This patent is subject to a terminal disclaimer.

(21) Appl. No.: 18/172,526

(22) Filed: Feb. 22, 2023

(65) Prior Publication Data

US 2023/0271167 A1  Aug. 31, 2023

Related U.S. Application Data

(60) Provisional application No. 63/268,536, filed on Feb. 25, 2022.

(51) Int. Cl.
*B01J 21/04* (2006.01)
*B01D 53/94* (2006.01)
(Continued)

(52) U.S. Cl.
CPC ............ *B01J 23/63* (2013.01); *B01D 53/945* (2013.01); *B01J 21/066* (2013.01); *B01D 2255/1025* (2013.01); *B01D 2255/2065* (2013.01); *B01D 2255/20715* (2013.01); *B01D 2257/40* (2013.01); *B01D 2257/502* (2013.01); *B01D 2257/702* (2013.01); *B01D 2258/014* (2013.01)

(58) Field of Classification Search
CPC . B01J 21/04; B01J 23/10; B01J 21/066; B01J 23/63; B01J 35/56; B01D 53/945
USPC ....... 502/304, 332–334, 339, 349, 355, 415, 502/439
See application file for complete search history.

(56) References Cited

U.S. PATENT DOCUMENTS

| 8,734,743 | B2 * | 5/2014 | Muller-Stach | ....... B01J 37/0244 502/352 |
| 9,034,269 | B2 * | 5/2015 | Hilgendorff | ......... B01D 53/944 502/262 |

(Continued)

FOREIGN PATENT DOCUMENTS

| CN | 113042042 A | 6/2021 |
| CN | 113042046 A | 6/2021 |

(Continued)

*Primary Examiner* — Cam N. Nguyen

(57) ABSTRACT

The present invention provides a catalyst article for treating exhaust gas comprising: a substrate comprising an inlet end and an outlet end with an axial length L; a first catalytic region comprising support material particles; at least some of the support material particles are rhodium-supporting support material particles having rhodium supported thereon at a concentration of from 0.001 to 3.5 wt. %, based on the weight of the rhodium-supporting support material particle; and the rhodium is present at a loading of up to 20 g/ft³ relative to the first catalytic region.

20 Claims, 17 Drawing Sheets

(51) Int. Cl.
  *B01J 21/06* (2006.01)
  *B01J 23/10* (2006.01)
  *B01J 23/63* (2006.01)
  *B01J 35/56* (2024.01)

(56) References Cited

U.S. PATENT DOCUMENTS

| | | | |
|---|---|---|---|
| 9,034,286 B2 * | 5/2015 | Bergeal | B01J 35/56 502/328 |
| 9,057,310 B2 * | 6/2015 | Bergeal | B01J 35/19 |
| 9,486,791 B2 * | 11/2016 | Swallow | B01J 35/56 |
| 9,527,034 B2 * | 12/2016 | Bergeal | B01J 23/42 |
| 9,527,035 B2 * | 12/2016 | Bergeal | B01D 53/62 |
| 9,707,542 B2 * | 7/2017 | Bergeal | B01D 53/9477 |
| 9,987,618 B2 * | 6/2018 | Chiffey | B01D 53/944 |
| 10,279,314 B2 * | 5/2019 | Bergeal | B01J 35/19 |
| 10,512,898 B2 * | 12/2019 | Deeba | B01J 23/63 |
| 10,569,257 B2 * | 2/2020 | Chiffey | B01J 29/7415 |
| 10,625,208 B2 * | 4/2020 | Bergeal | B01J 23/002 |
| 11,794,169 B2 * | 10/2023 | Chiffey | B01D 53/9468 |
| 11,904,299 B2 * | 2/2024 | Zheng | B01D 53/9477 |
| 12,055,083 B2 * | 8/2024 | Liu | B01J 23/464 |
| 2021/0301698 A1 * | 9/2021 | Armitage | B01J 37/04 |
| 2022/0297095 A1 * | 9/2022 | Zheng | B01J 21/04 |
| 2023/0113708 A1 * | 4/2023 | Qiao | B01D 53/945 502/339 |
| 2023/0129600 A1 * | 4/2023 | Zheng | B01J 37/0203 502/171 |

FOREIGN PATENT DOCUMENTS

| | | |
|---|---|---|
| IN | 202014052346 A | 7/2021 |
| IN | 202014054992 A | 7/2021 |
| WO | 2016123523 A1 | 8/2016 |
| WO | 2016123534 A1 | 8/2016 |
| WO | 2018138687 A1 | 8/2018 |
| WO | 2019065659 A1 | 4/2019 |
| WO | 2020263806 A1 | 12/2020 |

* cited by examiner

US 12,343,707 B2

CATALYST ARTICLE HAVING HIGH LOCAL RHODIUM CONCENTRATION

FIELD OF THE INVENTION

The invention relates to a catalyst article, a method of manufacturing a catalyst article, a catalyst article obtained or obtainable by the method, an emission treatment system and a method of treating an exhaust gas.

BACKGROUND OF THE INVENTION

A three-way catalyst (TWC) allows simultaneous conversions (~98%) of CO, HCs and $NO_x$ from gasoline engine exhaust to innocuous compounds at stoichiometric air-to-fuel ratio. Specifically, the oxidation of CO and HCs to $CO_2$ and steam ($H_2O$) is mainly catalyzed by Pd, while the reduction of $NO_x$ to $N_2$ is mainly catalyzed by Rh. Modern TWCs use supported platinum group metal (hereinafter "PGM") catalysts (Pd, Rh, Pt, etc.) deposited on a single, double or multilayer support, with the support material consisting of metal oxides with high specific surface area, primarily stabilized alumina and ceria-containing oxygen storage materials. The supported catalyst is washcoated on a ceramic monolithic substrate.

With the PGM price substantially increasing in recent years and the emission regulation restrictions becoming stricter, there is a need to reduce the usage of precious metals used in exhaust gas purification catalysts. Among the noble metals, Rh is the scarcest in the planet and the most expensive species. Thus, making Rh, in particular, highly activated is desired in order to reduce the cost of PGM usage, while still coping with tightened emission control regulations.

In emission control catalysts, one of the methods for reducing the amount of noble metal usage is to support noble metal on a carrier and use as fine particles. For example, WO2016123534A1 reports a PGM particle size of between 10~92 nm. These PGM nanoparticles were achieved by being supported on a nanoscale support within the range of 1~100 nm.

In certain emission control catalysts with lower Rh loading (e.g., <20 g/ft$^3$), extra fine Rh particles are formed, which are prone to be encapsulated by the support material due to strong metal support interaction (SMSI), leading to deteriorated catalytic performance during the following catalyst lifetime usage. High temperature exposure in addition with moisture in the feed gas compositions are the main reasons that cause fine Rh particle encapsulation or dissolution in the support matrix. The durability of the catalyst is therefore insufficient.

However, when initial Rh particles are large enough, Rh encapsulation/dissolution is less problematic. This is typically observed in catalysts with higher Rh loading (e.g., 20 g/ft$^3$ or higher).

SUMMARY OF THE INVENTION

One aspect of the present disclosure is directed to provides a catalyst article for treating exhaust gas comprising: a substrate comprising an inlet end and an outlet end with an axial length L; a first catalytic region comprising support material particles; at least some of the support material particles are rhodium-supporting support material particles having rhodium supported thereon at a concentration of from 0.001 to 3.5 wt. %, based on the weight of the rhodium-supporting support material particle; and the rhodium is present at a loading of up to 20 g/ft$^3$ relative to the first catalytic region.

Another aspect of the present disclosure is directed to a method of manufacturing a catalyst article, the method comprising: providing rhodium-supporting support material particles having rhodium supported thereon at a concentration of from 0.001 to 3.5 wt. %, based on the weight of the rhodium-supporting support material particle; providing non-supporting support material particles having essentially no rhodium supported thereon, preferably having no rhodium supported thereon; forming a washcoat comprising the rhodium-supporting support material particles and the non-supporting support material particles; and coating a substrate with the washcoat to provide a catalyst article wherein the rhodium is present at a loading of up to 20 g/ft$^3$.

Another aspect of the present disclosure is directed to a catalyst article obtained or obtainable by the method of the above aspect.

The invention also encompasses an emission treatment system comprising the catalyst article described herein and a method of treating an exhaust gas, the method comprising: providing the catalyst article described herein; and contacting the catalyst article with an exhaust gas.

BRIEF DESCRIPTION OF THE DRAWINGS

FIG. 2b depicts a variation of FIG. 2a.

FIG. 3b depicts a variation of FIG. 3a.

FIG. 4b depicts a variation of FIG. 4a.

FIGS. 5b and 5c depict variations of FIG. 5a.

FIGS. 6b-6f depict variations of FIG. 6a.

DETAILED DESCRIPTION OF THE INVENTION

Figure 1:
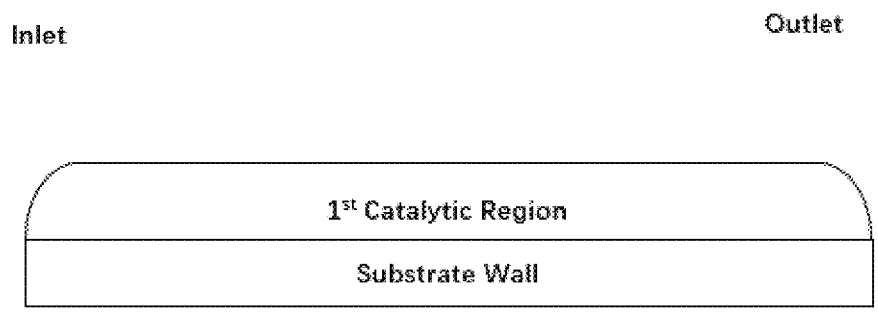
FIG. 1 shows one embodiment according to the present invention, which contains first catalytic region with a length of 100% to the axial length L of the substrate (single layer).

The present invention seeks to tackle at least some of the problems associated with the prior art or at least to provide a commercially acceptable alternative solution thereto.

In a first aspect, the present invention provides a catalyst article for treating exhaust gas comprising:
- a substrate comprising an inlet end and an outlet end with an axial length L;
- a first catalytic region comprising support material particles;
- at least some of the support material particles are rhodium-supporting support material particles having rhodium supported thereon at a concentration of from 0.001 to 3.5 wt. %, based on the weight of the rhodium-supporting support material particle; and
- the rhodium is present at a loading of up to 20 g/ft³ relative to the first catalytic region.

Each aspect or embodiment as defined herein may be combined with any other aspect(s) or embodiment(s) unless clearly indicated to the contrary. In particular, any features indicated as being preferred or advantageous may be combined with any other feature indicated as being preferred or advantageous.

First Catalytic Region

Preferably, the rhodium-supporting support material particles have rhodium supported thereon at a concentration of from 0.3 to 3.5 wt. %, based on the weight of the rhodium-supporting support material particle. More preferably, the rhodium-supporting support material particles have rhodium supported thereon at a concentration of from 0.4 to 3.0 wt. %, even more preferably from 0.4 to 2.0 wt. %, still more preferably from 0.4 to 1.5 wt. %, based on the weight of the rhodium-supporting support material particle. Alternatively, the rhodium-supporting support material particles have rhodium supported thereon at a concentration of from 0.3 to 1.8 wt. %, even more preferably from 0.4 to 1.2 wt. %, still more preferably from 0.4 to 1.0 wt. %, based on the weight of the rhodium-supporting support material particle.

In known catalyst articles, when rhodium is present at the relatively low loading of up to 20 g/ft$^3$ relative to the first catalytic region, the support material particles having rhodium supported thereon may not have as high a concentration of rhodium supported thereon as required in the present aspect. This may be because the rhodium is typically evenly supported, i.e. at a uniform concentration, on each support material particle present in a particular catalyst region. In other words, none of the support material particles having rhodium supported thereon may have a locally higher concentration of rhodium.

Surprisingly, when used in an emission treatment system, the catalyst article of the present invention, which has locally higher concentrations of rhodium as defined herein, but still a low overall loading of rhodium in order to reduce the use of PGMs, may exhibit significantly improved light-off performance {i.e. a lower light-off temperature, the temperature at which the conversion of a particular target species [$NO_x$, CO or total hydrocarbon (THC)] reaches 50%} compared with catalyst articles not having locally higher concentrations of rhodium. Moreover, having the locally higher concentrations of rhodium while maintaining low overall rhodium loading may result in larger particle sizes of rhodium on the rhodium supporting support material particles, which may surprisingly result in a catalyst article in which the rhodium particles are more resistant to sintering, oxidation and migration compared to other low-rhodium-loading catalyst articles. However, it has also been found that over concentrating the rhodium on the rhodium-supporting support material particles may then result in a reduction in catalytic activity. As such, there may be an optimal local rhodium concentration for a particular low total loading of rhodium.

The above effects may be particularly beneficial for catalyst articles having low total rhodium loading, but may not be observed for catalyst articles having a higher total rhodium loading. Without wishing to be bound by theory, it is thought that this may be because when the total loading of rhodium relative to the support is already high, the local concentration of rhodium on each of the support material particles is already high, and therefore there may not be a need to locally concentrate the rhodium on a portion of the support material. In other words, the present invention may mitigate the issues resulting from reducing the total Rh loading on a catalyst article by enabling some of the benefits associated with higher loadings to be present at low total loading, due to the presence of locally concentrated rhodium.

The term "catalyst article" used herein may encompass an article in which a catalyst is supported thereon or therein. The article may take the form of, for example, a honeycomb monolith, or a filter, e.g. a wall flow filter or a flow-through filter.

The term "substrate" as used herein may encompass, for example, a ceramic or metallic honeycomb, or a filter block, e.g. a wall flow filter or flow-through filter. The substrate may comprise a ceramic monolithic substrate. The substrate may vary in its material composition, size and configuration, cell shape and density, and wall thickness. Suitable substrates are known in the art.

The term "catalyst region" as used herein may encompass an area on a substrate, typically obtained by drying and/or calcining a washcoat. A "region" can, for example, be disposed or supported on a substrate as a "layer" or a "zone". The area or arrangement on a substrate is generally controlled during the process of applying the washcoat to the substrate. The "region" typically has distinct boundaries or edges (i.e. it is possible to distinguish one region from another region using conventional analytical techniques).

It is preferable that the "catalyst region" has a substantially uniform composition (i.e. there is no substantial difference in the composition of the washcoat when comparing one part of the region with another part of that region, on average). Substantially uniform composition in this context refers to a material (e.g., region) where the difference in composition when comparing one part of the region with another part of the region is 5% or less, usually 2.5% or less, and most commonly 1% or less.

The first catalyst region is preferably disposed on the substrate. The term "disposed on" in the context of this aspect may encompass both having the catalyst region directly disposed on the substrate, i.e. with no intervening material, and/or indirectly disposed on the substrate, i.e. with intervening material. If the substrate is porous, then the term "disposed on" may also encompass having the catalyst region disposed therein, for example within the pores of the substrate, i.e. wherein the catalyst region is disposed thereon and/or therein.

The term "washcoat" as used herein is well-known in the field and refers to an adherent coating that is applied to a substrate usually during the production of a catalyst. Preferably, the first catalyst region is a washcoat layer.

The term "support material" as used herein may encompass any known support material that may be used to support PGMs in the field of the present invention, typically in powder form. The support material is not particularly limited and suitable support materials are known in the art. Without wishing to be bound by theory, it is thought that the benefits of the invention may be independent of the support material. However, preferred support materials are outlined herein.

In the context of the present invention, "rhodium-supporting support material particles" are support material particles that have rhodium supported thereon. The term "supported thereon" in this context means that the rhodium, typically in the form of nanoparticles, is directly in contact, and physical and/or chemically bound to the surface of the support material. The term "surface of the support material" may encompass the surface of the pores within a porous support material.

Preferably, the rhodium is not alloyed with another metal.

Preferably, the rhodium-supporting support material particles are substantially evenly dispersed throughout the first catalyst region. In this context the term "substantially evenly dispersed" may encompass that the concentration of rhodium-supporting support material particles in one arbitrary sub-region of the first catalyst region is substantially the same as the concentration of rhodium-supporting support material particles in a different arbitrary sub-region of the first catalyst region, such as within 5%, within 3%, within 2% and preferably within 1% of the concentration.

At least some of the support material particles are rhodium-supporting support material particles having rhodium supported thereon at a concentration of from 0.001 to 3.5 wt. %, based on the weight of the rhodium-supporting support material particle. By "based on the weight of the rhodium-supporting support material particle", it is meant that the weight of the rhodium is from 0.001 to 3.5% of the weight of the support material particle (e.g. alumina powder grain). In other words, the term "wt. %" relates to the weight of the support material particle, rather than the total weight of the support material particle and the rhodium. Preferably, the rhodium-supporting support material particles have rhodium supported thereon at a concentration of from 0.3 to 3.5 wt. %, more preferably from 0.4 to 3.0 wt. %, even more preferably from 0.4 to 2.0 wt. %, still more preferably from 0.4 to 1.8 wt. %, yet still more preferably from 0.4 to 1.6 wt. %, yet still more preferably from 0.4 to 1.5 wt. %, based on the weight of the rhodium-supporting support material particle. For example, the rhodium-supporting support material particles preferably have rhodium supported thereon at a concentration of from 0.4 to 1.3 wt. %, based on the weight of the rhodium-supporting support material particle. In an alternative preferred embodiment, the rhodium-supporting support material particles have rhodium supported thereon at a concentration of from 0.4 to 1.8 wt. %, based on the weight of the rhodium-supporting support material particle. It will be appreciated that the invention may encompass preferred sub-ranges made out of combining any of the above-described end points.

Without wishing to be bound by theory, it is thought that maintaining a similar amount of total support material compared to a conventional catalyst region not having locally-concentrated rhodium-supporting support materials, but evenly-distributed, low-concentration rhodium, may enable the thermal durability properties of the support material, such as alumina, to be maintained. Thus, it is preferred that at least some of the support material particles are non-supporting support material particles having essentially no rhodium supported thereon, preferably having no rhodium supported thereon. In the context of the present invention, "non-supporting support material particles" are support material particles that have essentially no rhodium supported thereon, preferably having no rhodium supported thereon.

The term "essentially no rhodium" as used herein may encompass that the non-supporting support material particles have rhodium supported thereon at a concentration of less than 0.001 wt. %, preferably less than 0.0005 wt. %, more preferably less than 0.0001 wt. %, based on the weight of the rhodium-supporting support material particle. In other words, preferably the amount of rhodium supported on the non-supporting support material particles is negligible. However, it will be appreciated that, in practice, under the high-temperature conditions of the intended use of such a catalyst article, small amounts of rhodium may migrate from the rhodium-supporting support material particles to the non-supporting support material particles. To a certain extent, this may be unavoidable within technical limitations. Thus, the invention is intended to encompass unavoidable amounts of rhodium being supported on the non-supporting support material particles.

In addition, without wishing to be bound by theory it is also thought that the presence of the non-supporting support material particles may provide a physical barrier and/or create further distance between rhodium-supporting support material particles, such that the likelihood of sintering and coalescence of rhodium nanoparticles on different rhodium-supporting support material particles may be reduced, for example when the catalyst article is subjected to ageing conditions. Such advantages may not be achieved by simply reducing the amount of total support material in a known catalyst, while maintaining the same amount of rhodium, in order to achieve higher rhodium concentration on every support material particle (i.e. having 100% rhodium-supporting support material particles in the first catalyst region, based on the total amount of the support material in the first catalyst region).

Preferably, from 5 to 80% of the support material particles in the first catalyst region are rhodium-supporting support material particles. In other words, from 5 to 80% of the rhodium-supporting support material particles and non-supporting support material particles in the first catalyst region are rhodium-supporting support material particles. The % in this context is simply the number percentage, which can be measured by TEM or any other suitable means. More preferably, from 7 to 60%, even more preferably from 10 to 50%, still more preferably from 11 to 45%, yet still more preferably from 13 to 40%, and yet still more preferably from 15 to 35% of the support material particles in the first catalyst region are rhodium-supporting support material particles. For example, preferably from 10 to 25% of the support material particles in the first catalyst region are rhodium-supporting support material particles. In an alternative preferred embodiment, from 20 to 35% of the support material particles in the first catalyst region are rhodium-supporting support material particles.

Without wishing to be bound by theory, it is thought that having rhodium supported on only a small percentage of the support material particles, compared to catalyst articles of a similar rhodium loading but having rhodium supported on all support material particles, may result in an improved catalyst article having improved light-off performance and resistance to sintering for the reasons hypothesised herein.

Preferably, the support material particles, i.e. the support material particles of the first catalyst region, consist essentially of the rhodium-supporting support material particles and the non-supporting support material particles. In other words, the rhodium-supporting support material particles and the non-supporting support material particles preferably make up 90 wt. % or more of the support material particles, more preferably 95 wt. % or more, even more preferably 97 wt. % or more, still more preferably 99 wt. % or more of the support material particles. Most preferably, the support material particles, i.e. the support material particles of the first catalyst region, consist of the rhodium-supporting support material particles and the non-supporting support material particles.

Preferably, the first catalyst region consists of the rhodium-supporting support material particles, the non-supporting support material particles, and optionally a binder.

The support material particles can be alumina, ceria, zirconia, magnesia, silica, lanthanum, neodymium, praseodymium, yttrium oxides, and mixed oxides or composite oxides thereof. In some embodiments, the support material particles can be an oxygen storage capacity (OSC) material, such as, cerium oxide, a ceria-zirconia mixed oxide, an alumina-ceria-zirconia mixed oxide, or a combination thereof. In other embodiments, the support material particles can be alumina, a lanthanum/alumina composite oxide, or a magnesia/alumina composite oxide. Preferably, the support material particles comprise alumina and/or a ceria-zirconia mixed oxide. In some preferred embodiments, the support material is alumina. In other preferred embodiments, the support material is a ceria-zirconia mixed oxide. Preferably, the alumina and/or a ceria-zirconia mixed oxide is doped, preferably wherein the alumina and/or a ceria-zirconia mixed oxide is doped with an oxide of one or more of lanthanum, neodymium, yttrium, niobium, praseodymium, hafnium, molybdenum, titanium, vanadium, zinc, cadmium, manganese, iron, copper, calcium, barium, strontium, caesium, magnesium, potassium and sodium, preferably one or more of lanthanum, neodymium and yttrium. Preferably, the dopant is present in the alumina and/or ceria-zirconia mixed oxide in an amount of from 0.001 wt. % to 20 wt. %, more preferably from 0.5 wt. % to 10 wt. %. The wt. % may be based on the total weight of the alumina and/or ceria-zirconia mixed oxide.

Preferably, the support material particles have a $D_{90}$ of from 0.1 to 25 µm, preferably from 0.5 to 5 µm. The term "$D_{90}$" as used herein may encompass the value in the size distribution, up to and including which, 90% of the total volume of material in the sample is 'contained'. The $D_{90}$ may be measured using any suitable technique, such as TEM.

Preferably, the support material particles comprise a ceria-zirconia mixed oxide; and wherein when a cross section of the first catalyst region of the catalyst article is subjected to area analysis by FE-EPMA under conditions of pixel (section) size of 0.34 µm×0.34 µm and number of measured pixels (sections) of 256×256, a characteristic X-ray intensity ($\alpha$: cps) of the zirconium (Zr) and a characteristic X-ray intensity ($\beta$: cps) of the rhodium (Rh) are measured for each pixel, and the Pearson correlation coefficient calculated using the resulting $\alpha$ and $\beta$ in each pixel is designated as $R_{Zr/Rh}$, then the value of $R_{Zr/Rh}$ is from 0.15 to 0.48. More preferably, the value of $R_{Zr/Rh}$ is from 0.3 to 0.45.

The Pearson correlation coefficient (product moment correlation coefficient) is known to the skilled person and is calculated based on the results of area analysis by FE-EPMA (field emission-electron probe micro-analysis). The correlation coefficient $R_{Zr/Rh}$ is determined by the formula: $R_{Zr/Rh}=$ (covariance)/(standard deviation of $\alpha$×standard deviation of $\beta$), wherein the first variable ($\alpha$) is a characteristic X-ray intensity of the zirconium (Zr) and the second variable ($\beta$) is a characteristics X-ray intensity of the rhodium (Rh) in area analysis by FE-EPMA. Such a calculation is known to the skilled person. In other words, preferably, the zirconium and the rhodium are not highly correlated in such a catalyst article. That is, the rhodium is preferably not highly dispersed with reference to the zirconium in the support material. This may be due to the higher localised concentrations of rhodium on certain support material particles and then the presence of non-supporting support material particles. Thus, this may be a convenient method of characterising the preferred distribution of rhodium on the support material in the invention, which may enable the above-described technical advantages.

Preferably, the rhodium is present at a loading of from 1 to 20 g/ft³ relative to the first catalytic region (e.g., especially when the first catalytic region extends less than the full length L of the substrate, such as 20 to 80%, 30 to 70%, or 40 to 60% of the full length L), more preferably from 2 to 18 g/ft³, even more preferably from 3 to 16 g/ft³, still more preferably from 4 to 16 g/ft³. Alternatively, the rhodium is present at a loading of from 1 to 20 g/ft³ relative to the first catalytic region (e.g., especially when the first catalytic region extends for the full length of the substrate), more preferably from 2 to 15 g/ft³, even more preferably from 3 to 10 g/ft³, still more preferably from 4 to 10 g/ft³. The benefits described herein may be particularly strong at such low loadings. Moreover, such low loadings are in line with the general desired direction in the field to reduce PGM usage.

Preferably, the support particles are present at a loading of from 0.5 to 3 g/in³ relative to the first catalytic region. Methods of calculation of such loadings are well-known to those skilled in the art. More preferably, the support material particles are present at a loading of from 0.5 to 2 g/in³, even more preferably from 0.6 to 2 g/in³, still more preferably from 0.75 to 2 g/in³, even more preferably from 0.8 to 2 g/in³ relative to the first catalytic region. In some preferred embodiments, the support material particles are present at a loading of about 1 g/in³ relative to the first catalytic region. Such a loading may be particularly suitable for obtaining the advantages described herein at the particular rhodium loadings required by the claims.

Preferably, the first catalyst region further comprises a binder, preferably wherein the binder comprises a further alumina species, such as alumina, preferably gamma alumina, more preferably lanthanum-doped gamma alumina, such as 4% La—$Al_2O_3$. The binder is preferably present in an amount of from 0.5 to 2 g/in³ relative to the substrate, more preferably about 1.0 g/in³. The presence of such an additional binder may be particularly suitable when the first catalyst region is a washcoat layer, for example.

The catalyst article preferably further comprises one or more further catalyst regions. The one or more further catalyst regions may be different to the catalyst region described herein and required by the invention. For example, the one or more further catalyst regions may be any suitable further catalyst region known to the skilled person. In particular, it is preferred that the one or more further catalyst regions comprise one or more catalyst regions for three-way catalysis. Preferably, one or more of the further catalyst regions comprise platinum and/or palladium. The platinum and/or palladium may be supported on a support material. Suitable support materials are known in the art.

Second Catalytic Region

The catalytic article may further comprise a second catalytic region.

The second catalytic region can further comprise a second PGM component, a second oxygen storage capacity (OSC) material, a second alkali or alkaline earth metal component, and/or a second inorganic oxide.

The second PGM component can be selected from the group consisting of platinum, palladium, rhodium, and a mixture thereof. In some embodiments, the second PGM component can be Pd, Rh or a mixture thereof.

The second OSC material can be cerium oxide, zirconium oxide, a ceria-zirconia mixed oxide, an alumina-ceria-zirconia mixed oxide, or a combination thereof. More preferably, the second OSC material comprises the ceria-zirconia mixed oxide, the alumina-ceria-zirconia mixed oxide, or a combination thereof. In addition, the second OSC material may further comprise one or more of dopants like lanthanum, neodymium, praseodymium, yttrium etc. Moreover, the second OSC material may have the function as a support material for the second PGM component. In some embodiments, the second OSC material comprises the ceria-zirconia mixed oxide and the alumina-ceria-zirconia mixed oxide.

The ceria-zirconia mixed oxide can have a weight ratio of zirconia to ceria at least 50:50; preferably, higher than 60:40; more preferably, higher than 70:30. Alternatively, the ceria-zirconia mixed oxide also can have a weight ratio of ceria to zirconia less than 50:50, preferably, less than 40:60, more preferably, less than 30:70.

The second OSC material (e.g., ceria-zirconia mixed oxide) can be from 10 to 90 wt. %; preferably, 25-75 wt. %; more preferably, 30-60 wt. %, based on the total washcoat loading of the second catalytic region.

The second OSC material loading in the second catalytic region can be less than 2 g/in$^3$. In some embodiments, the second OSC material loading in the second catalytic region is no greater than 1.5 g/in$^3$, 1.2 g/in$^3$, 1 g/in$^3$, 0.8 g/in$^3$, or 0.7 g/in$^3$.

The second alkali or alkaline earth metal is preferably barium, strontium, mixed oxides or composite oxides thereof. Preferably the barium or strontium, where present, is in an amount of 0.1 to 15 wt. %, and more preferably 3 to 10 wt. % of barium or strontium, based on the total weight of the second catalytic region.

It is even more preferable that the second alkali or alkaline earth metal is strontium. The strontium, where present, is preferably present in an amount of 0.1 to 15 wt. %, and more preferably 3 to 10 wt. %, based on the total weight of the second catalytic region.

It is also preferable that the second alkali or alkaline earth metal is mixed oxides or composite oxide of barium and strontium. Preferably, the mixed oxides or composite oxide of barium and strontium is present in an amount of 0.1 to 15 wt. %, and more preferably 3 to 10 wt. %, based on the total weight of the second catalytic region. It is more preferable that the second alkali or alkaline earth metal is composite oxide of barium and strontium.

Preferably the barium or strontium is present as $BaCO_3$ or $SrCO_3$. Such a material can be performed by any method known in the art, for example incipient wetness impregnation or spray-drying.

The second inorganic oxide is preferably an oxide of Groups 2, 3, 4, 5, 13 and 14 elements. The second inorganic oxide is preferably selected from the group consisting of alumina, magnesia, silica, zirconia, barium oxides, and mixed oxides or composite oxides thereof. Particularly preferably, the second inorganic oxide is alumina, lanthanum-alumina, zirconia, or a magnesia/alumina composite oxide. One especially preferred second inorganic oxide is alumina or lanthanum-alumina.

The second OSC material and the second inorganic oxide can have a weight ratio of no greater than 10:1; preferably, no greater than 8:1 or 5:1; more preferably, no greater than 4:1 or 3:1; most preferably, no greater than 2:1.

Alternatively, the second OSC material and the second inorganic oxide can have a weight ratio of 10:1 to 1:10; preferably, 8:1 to 1:8 or 5:1 to 1:5; more preferably, 4:1 to 1:4 or 3:1 to 1:3; and most preferably, 2:1 to 1:2.

In some embodiments, the second OSC material and the second inorganic oxide can have a weight ratio of no less than 2:1. In further embodiments, the second OSC material and the second inorganic oxide can have a weight ratio of no less than 10:1. In another further embodiments, the second OSC material and the second inorganic oxide can have a weight ratio of no less than 20:1 or no less than 30:1. In yet another further embodiments, the second OSC material and the second inorganic oxide can have a weight ratio of no less than 40:1 or no less than 50:1.

The total washcoat loading of the second catalytic region can be less than 3.5 g/in$^3$; preferably, less than 3.0 g/in$^3$ or 2.5 g/in$^3$. Alternatively, the total washcoat loading of the first catalytic region can be from 0.5 to 3.5 g/in$^3$; preferably, can be from 0.6 to 3 g/in$^3$ or 0.7 to 2.5 g/in$^3$.

The second catalytic region can extend for 100 percent of the axial length L. (E.g., see FIGS. 2a, 2b, and 6a-6c) The second catalytic region can extend for 30 to 70 percent of the axial length L.

Preferably, for 40 to 60 percent, more preferably, 45 to 55 percent of the axial length L. and most preferably, the total length of the second region and the first region is equal or greater than the axial length L (E.g., see FIGS. 3a-5d and 7a-7l).

Figure 3A:
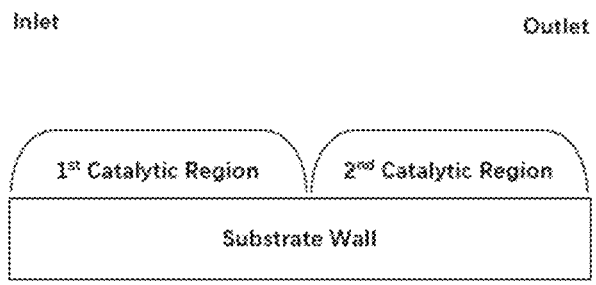
FIG. 3a shows one embodiment according to the present invention, the first catalytic region extends less than 100% of the axial length L, from the inlet end; the second catalytic region extends less than 100% of the axial length L, from the outlet end. The total length of the second and the first catalytic region is equal or less than the axial length L.
Figure 3B:
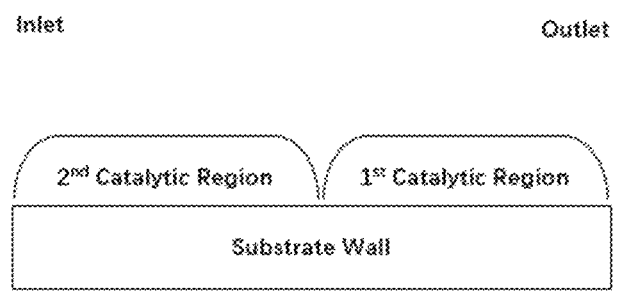
Figure 3C:
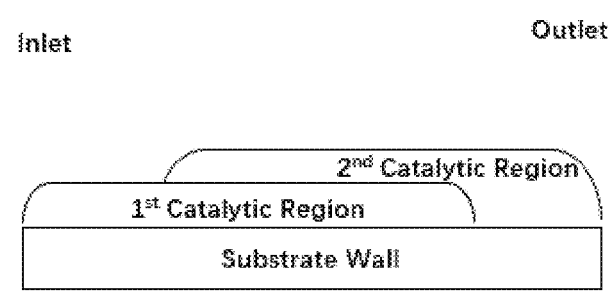
FIG. 3c shows one embodiment according to the present invention, the first catalytic region extends less than 100% of the axial length L, from the inlet end; the second catalytic region extends less than 100% of the axial length L, from the outlet end. The total length of the second and the first catalytic region is greater than the axial length L.
Figure 3D:
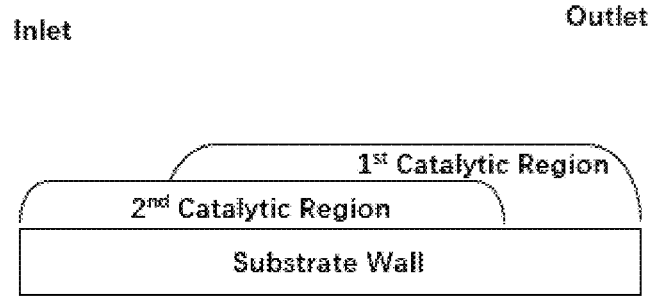
FIG. 3d depicts a variation of FIG. 3c.

The second catalytic region can overlap with the first catalytic region for 0.1 to 99 percent of the axial length L (e.g., see FIGS. 3c and 3d, the first catalytic region can overlie the second catalytic region or the second catalytic region can overlie the first catalytic region). Alternatively, the total length of the second catalytic region and the first catalytic region can equal to the axial length L (e.g., see FIGS. 3a and 3b). In yet another alternative, total the length of the second catalytic region and the first catalytic region can be less than the axial length L, for example, no greater than 95%, 90%, 80%, or 70% of the axial length L.

In some embodiments, the first catalytic region can be supported/deposited directly on the substrate. In certain embodiments, the second catalytic region can be supported/deposited directly on the substrate.

Third Catalytic Region

The catalytic article may further comprise a third catalytic region.

The third catalytic region can further comprise a third PGM component, a third oxygen storage capacity (OSC) material, a third alkali or alkaline earth metal component, and/or a third inorganic oxide.

The third PGM component can be selected from the group consisting of platinum, palladium, rhodium, and a mixture thereof. In some embodiments, the third PGM component can be Pd, Rh or a mixture thereof.

The third OSC material can be cerium oxide, zirconium oxide, a ceria-zirconia mixed oxide, an alumina-ceria-zirconia mixed oxide, or a combination thereof. More preferably, the third OSC material comprises the ceria-zirconia mixed oxide, the alumina-ceria-zirconia mixed oxide, or a combination thereof. In addition, the third OSC material may further comprise one or more of dopants like lanthanum, neodymium, praseodymium, yttrium etc. Moreover, the third OSC material may have the function as a support material for the third PGM component. In some embodiments, the third OSC material comprises the ceria-zirconia mixed oxide and the alumina-ceria-zirconia mixed oxide.

The ceria-zirconia mixed oxide can have a weight ratio of zirconia to ceria at least 50:50; preferably, higher than 60:40; more preferably, higher than 75:25. Alternatively, the ceria-zirconia mixed oxide also can have a weight ratio of ceria to zirconia less than 50:50; preferably, less than 40:60; more preferably, less than 25:75.

The third OSC material (e.g., ceria-zirconia mixed oxide) can be from 10 to 90 wt. %; preferably, 25-75 wt. %; more preferably, 30-60 wt. %, based on the total washcoat loading of the third catalytic region.

The third OSC material loading in the third catalytic region can be less than 1.5 g/in$^3$. In some embodiments, the third OSC material loading in the second catalytic region is no greater than 1.2 g/in$^3$, 1.0 g/in$^3$, 0.9 g/in$^3$, 0.8 g/in$^3$, or 0.7 g/in$^3$.

The total washcoat loading of the third catalytic region can be less than 3.5 g/in$^3$; preferably, no more than 3.0 g/in$^3$, 2.5 g/in$^3$, or 2 g/in$^3$.

The third alkali or alkaline earth metal is preferably barium, strontium, mixed oxides or composite oxides thereof. Preferably the barium or strontium, where present, is in an amount of 0.1 to 15 wt. %, and more preferably 3 to 10 wt. % of barium or strontium, based on the total weight of the third catalytic region.

It is even more preferable that the third alkali or alkaline earth metal is strontium. The strontium, where present, is preferably present in an amount of 0.1 to 15 wt. %, and more preferably 3 to 10 wt. %, based on the total weight of the third catalytic region.

It is also preferable that the third alkali or alkaline earth metal is mixed oxides or composite oxide of barium and strontium. Preferably, the mixed oxides or composite oxide of barium and strontium is present in an amount of 0.1 to 15 wt. %, and more preferably 3 to 10 wt. %, based on the total weight of the third catalytic region. It is more preferable that the third alkali or alkaline earth metal is composite oxide of barium and strontium.

Preferably the barium or strontium is present as $BaCO_3$ or $SrCO_3$. Such a material can be performed by any method known in the art, for example incipient wetness impregnation or spray-drying.

The third inorganic oxide is preferably an oxide of Groups 2, 3, 4, 5, 13 and 14 elements. The third inorganic oxide is preferably selected from the group consisting of alumina, magnesia, silica, zirconia, barium oxides, and mixed oxides or composite oxides thereof. Particularly preferably, the third inorganic oxide is alumina, lanthanum-alumina, zirconia, or a magnesia/alumina composite oxide. One especially preferred third inorganic oxide is alumina or lanthanum-alumina.

The third OSC material and the third inorganic oxide can have a weight ratio of no greater than 10:1; preferably, no greater than 8:1 or 5:1; more preferably, no greater than 4:1 or 3:1; most preferably, no greater than 2:1.

Alternatively, the third OSC material and the third inorganic oxide can have a weight ratio of 10:1 to 1:10; preferably, 8:1 to 1:8 or 5:1 to 1:5; more preferably, 4:1 to 1:4 or 3:1 to 1:3; and most preferably, 2:1 to 1:2.

In some embodiments, the third OSC material and the third inorganic oxide can have a weight ratio of no less than 2:1. In further embodiments, the third OSC material and the third inorganic oxide can have a weight ratio of no less than 10:1. In another further embodiments, the third OSC material and the third inorganic oxide can have a weight ratio of no less than 20:1 or no less than 30:1. In yet another further embodiments, the third OSC material and the third inorganic oxide can have a weight ratio of no less than 40:1 or no less than 50:1.

The third catalytic region can extend for 100 percent of the axial length L (e.g., see FIGS. 4a-4d and 6a-6c).

The third catalytic region can be less than the axial length L, for example, no greater than 95%, 90%, 80%, or 70% of the axial length L (e.g., see FIGS. 5a-5d and 7g-7l).

The second catalytic region can overlap with the first catalytic region for 0.1 to 99 percent of the axial length L (e.g., see FIGS. 7a-7l), the first catalytic region can overlie the second catalytic region, or the second catalytic region can overlie the first catalytic region). Alternatively, the either of second or first region can extend for 30 to 70 percent of the axial length L. Preferably, for 40 to 60 percent, more preferably, 45 to 55 percent of the axial length L. and most preferably, the total length of the second and the first region is equal or less than the axial length L (e.g., see FIGS. 4a-4d).

Preferably, the catalyst article comprises a substrate, the first catalyst region described herein and a second catalyst region. In other words, the catalyst article preferably further comprises a second catalyst region. The second catalyst region preferably has a different composition to that of the first catalyst region. Preferably, the second catalyst region comprises a PGM supported on a support material, and optionally one or more of a binder and a promoter. The PGM preferably comprises palladium. The support material preferably comprises alumina and/or a ceria zirconia mixed oxide as described herein. The binder preferably comprises alumina. The promoter preferably comprises barium.

The first catalyst region is preferably disposed on, preferably directly on, the second catalyst region. For example, preferably the second catalyst region is disposed directly on the substrate and the first catalyst region is disposed directly on the second catalyst region. In these embodiments, the first and second catalyst regions are preferably washcoat layers, and the washcoat layers are each preferably applied over the entire length of the substrate.

In an alternative preferred embodiment, the catalyst article comprises a substrate, the first catalyst region described herein, a second catalyst region and a third catalyst region. In other words, the catalyst article preferably further comprises a second catalyst region and a third catalyst region. The second and third catalyst regions preferably have different compositions to that of the first catalyst region. Moreover, the second catalyst region preferably has a different composition to that of the third catalyst region.

Preferably, the second catalyst region in this embodiment is as described in the above alternative preferred embodiment. However, in this embodiment the first and third catalyst regions are preferably disposed on, preferably directly on, the second catalyst region in the form of zones. In particular, the second catalyst region is preferably disposed directly on the substrate, and the first and third catalyst regions are preferably each disposed directly on the second catalyst region. The second catalyst region is preferably disposed on the entire length of the substrate and the first and third catalyst regions are preferably disposed in the form of zones on the second catalyst region. In these preferred embodiments, the first, second and third catalyst regions are preferably in the form of washcoat layers.

In these preferred embodiments, the first catalyst region is preferably the rear zone, i.e. located at the intended outlet end of the catalyst article, and the third catalyst region is preferably the front zone, i.e. located at the intended inlet end of the catalyst article.

The third catalyst region preferably comprises rhodium supported on a support material. The rhodium is preferably disposed on all of the support material particles, i.e. as in a standard catalyst region. The support material is preferably alumina and/or a ceria-zirconia mixed oxide as described herein. When the support material of the rhodium-supporting support material particles in the first catalyst region comprises alumina, the support material of the third catalyst region preferably comprises a ceria-zirconia mixed oxide. When the support material of the rhodium-supporting support material particles in the first catalyst region comprises a ceria-zirconia mixed oxide, the support material of the third catalyst region preferably comprises alumina.

When the first and third catalyst regions are zoned, the two zones together are preferably applied over the entire length of the substrate, which is preferably the entire length of the second catalyst region.

Such preferred arrangements of the first, second and optionally third catalyst regions may surprisingly result in improved $NO_x$ abatement, particularly during cold start conditions, as well as lower light-off temperatures.

Improved CO and/or THC abatement may also be observed. Improved aged OSC properties may also be observed.

The term "zone" as used herein refers to a region having a length that is less than the total length of the substrate, such as ≤75% of the total length of the substrate. A "zone" typically has a length (i.e. a substantially uniform length) of at least 5% (e.g. ≥5%) of the total length of the substrate.

The total length of a substrate is the distance between its inlet end and its outlet end (e.g. the opposing ends of the substrate).

Any reference to a "zone disposed at an inlet end of the substrate" used herein refers to a zone disposed or supported on a substrate where the zone is nearer to an inlet end of the substrate than the zone is to an outlet end of the substrate. Thus, the midpoint of the zone (i.e. at half its length) is nearer to the inlet end of the substrate than the midpoint is to the outlet end of the substrate. Similarly, any reference to a "zone disposed at an outlet end of the substrate" used herein refers to a zone disposed or supported on a substrate where the zone is nearer to an outlet end of the substrate than the zone is to an inlet end of the substrate. Thus, the midpoint of the zone (i.e. at half its length) is nearer to the outlet end of the substrate than the midpoint is to the inlet end of the substrate.

When the substrate is a wall-flow filter, then generally any reference to a "zone disposed at an inlet end of the substrate" refers to a zone disposed or supported on the substrate that is:
 (a) nearer to an inlet end (e.g. open end) of an inlet channel of the substrate than the zone is to a closed end (e.g. blocked or plugged end) of the inlet channel, and/or
 (b) nearer to a closed end (e.g. blocked or plugged end) of an outlet channel of the substrate than the zone is to an outlet end (e.g. open end) of the outlet channel.

Thus, the midpoint of the zone (i.e. at half its length) is (α) nearer to an inlet end of an inlet channel of the substrate than the midpoint is to the closed end of the inlet channel, and/or (b) nearer to a closed end of an outlet channel of the substrate than the midpoint is to an outlet end of the outlet channel.

Similarly, any reference to a "zone disposed at an outlet end of the substrate" when the substrate is a wall-flow filter refers to a zone disposed or supported on the substrate that is:
 (a) nearer to an outlet end (e.g. an open end) of an outlet channel of the substrate than the zone is to a closed end (e.g. blocked or plugged) of the outlet channel, and/or
 (b) nearer to a closed end (e.g. blocked or plugged end) of an inlet channel of the substrate than it is to an inlet end (e.g. an open end) of the inlet channel.

Thus, the midpoint of the zone (i.e. at half its length) is (α) nearer to an outlet end of an outlet channel of the substrate than the midpoint is to the closed end of the outlet channel, and/or (b) nearer to a closed end of an inlet channel of the substrate than the midpoint is to an inlet end of the inlet channel.

A zone may satisfy both (a) and (b) when the washcoat is present in the wall of the wall-flow filter (i.e. the zone is in-wall).

Preferably, the first catalyst region is a single washcoat layer disposed on the substrate. The single washcoat layer may be coated along the entire length of the substrate, or over only a portion thereof. For example, preferably, the single washcoat layer is coated from one end (e.g. the inlet end or the outlet end in terms of the direction of intended use in an exhaust system) of the substrate, preferably coating less than 90%, less than 80%, less than 70%, less than 60%, less than 50%, less than 40%, less than 30%, less than 20%, or less than 10% of the length of the substrate. Preferably, the single washcoat layer is coated directly on the substrate. In an alternative preferred embodiment, there is one or more intervening washcoat layers located between the single washcoat layer of the invention and the substrate. The one or more intervening washcoat layers in this embodiment may be any suitable washcoat layer known to the skilled person. Preferably, the one or more intervening washcoat layers may be suitable for three-way catalysis. In other words, the catalyst article preferably further comprises one or more further washcoat layers.

Preferably, the first catalyst region further comprises platinum and/or palladium. The platinum and/or palladium may be supported on a support material. Suitable support materials are known in the art.

Preferably, the catalyst article is for three-way catalysis. In other words, the catalyst article is preferably a TWC.

Substrate

Preferably the substrate is a flow-through monolith. Alternatively, the substrate can be a wall-flow filter.

The flow-through monolith substrate has a first face and a second face defining a longitudinal direction there between. The flow-through monolith substrate has a plurality of channels extending between the first face and the second face. The plurality of channels extends in the longitudinal direction and provide a plurality of inner surfaces (e.g. the surfaces of the walls defining each channel). Each of the plurality of channels has an opening at the first face and an opening at the second face. For the avoidance of doubt, the flow-through monolith substrate is not a wall flow filter.

The first face is typically at an inlet end of the substrate and the second face is at an outlet end of the substrate.

The channels may be of a constant width and each plurality of channels may have a uniform channel width.

Preferably within a plane orthogonal to the longitudinal direction, the monolith substrate has from 300 to 900 channels per square inch, preferably from 400 to 800. For example, on the first face, the density of open first channels and closed second channels is from 600 to 700 channels per square inch. The channels can have cross sections that are rectangular, square, circular, oval, triangular, hexagonal, or other polygonal shapes.

The monolith substrate acts as a support for holding catalytic material. Suitable materials for forming the monolith substrate include ceramic-like materials such as cordierite, silicon carbide, silicon nitride, zirconia, mullite, spodumene, alumina-silica magnesia or zirconium silicate, or of porous, refractory metal. Such materials and their use in the manufacture of porous monolith substrates are well known in the art.

It should be noted that the flow-through monolith substrate described herein is a single component (i.e. a single brick). Nonetheless, when forming an emission treatment system, the substrate used may be formed by adhering together a plurality of channels or by adhering together a plurality of smaller substrates as described herein. Such techniques are well known in the art, as well as suitable casings and configurations of the emission treatment system.

In embodiments wherein the catalyst article of the present comprises a ceramic substrate, the ceramic substrate may be made of any suitable refractory material, e.g., alumina, silica, ceria, zirconia, magnesia, zeolites, silicon nitride, silicon carbide, zirconium silicates, magnesium silicates, aluminosilicates and metallo aluminosilicates (such as cordierite and spodumene), or a mixture or mixed oxide of any two or more thereof. Cordierite, a magnesium aluminosilicate, and silicon carbide are particularly preferred.

In embodiments wherein the catalyst article of the present invention comprises a metallic substrate, the metallic substrate may be made of any suitable metal, and in particular heat-resistant metals and metal alloys such as titanium and stainless steel as well as ferritic alloys containing iron, nickel, chromium, and/or aluminium in addition to other trace metals.

Preferably, the substrate comprises a wall flow filter substrate. In an alternative preferred embodiment, the substrate comprises a flow-through substrate. The substrate may be a "blank", i.e. un-washcoated, substrate. Alternatively, the substrate may have one or washcoats already loaded thereon. In such a situation, the final catalyst article may comprise multiple layers of different washcoats. The substrate preferably comprises cordierite. However, the composition of the substrate is not particularly limited.

In a further aspect, the present invention provides a method of manufacturing a catalyst article, the method comprising:

providing rhodium-supporting support material particles having rhodium supported thereon at a concentration of from 0.001 to 3.5 wt. %, based on the weight of the rhodium-supporting support material particle;

providing non-supporting support material particles having essentially no rhodium supported thereon, preferably having no rhodium supported thereon;

forming a washcoat comprising the rhodium-supporting support material particles and the non-supporting support material particles; and coating a substrate with the washcoat to provide a catalyst article wherein the rhodium is present at a loading of up to 20 g/ft$^3$ relative to the substrate.

Unless otherwise stated, the preferred features and embodiments relating to the first aspect, and in particular any preferred features of the rhodium-supporting support material particles, the non-supporting support material particles, the first and/or further catalyst regions, the support material particles in general, the substrate and the catalyst article as a whole, apply equally to this aspect.

Providing rhodium-supporting support material particles having rhodium supported thereon may comprise providing support material particles and supporting rhodium thereon. Such a method is known in the art and any suitable technique may be used.

Forming a washcoat comprising the rhodium-supporting support material particles and the non-supporting support material particles preferably comprises combining the rhodium-supporting support material particles and the non-supporting support material particles with water, in any order, to form a slurry. The term "slurry" as used herein may encompass a liquid comprising insoluble material, e.g. insoluble particles. The slurry is typically stirred, more typically for at least 10 minutes, more typically for at least 30 minutes, even more typically for at least an hour. Such washcoat preparation methods are known in the art, and the technique is not particularly limited.

Coating a substrate with the washcoat may be carried out using techniques known in the art. Typically, the washcoat may be poured into the inlet of the substrate using a specific moulding tool in a predetermined amount, thereby coating the washcoat on the substrate. Alternatively, coating a substrate with the washcoat may be carried out by immersing the substrate in the washcoat. Subsequent vacuum and/or air knife and/or drying steps may be employed during the coating step. When the substrate is a filter block, the washcoat may be coated on the filter walls, within the filter walls (if porous) or both.

It is essential that coating a substrate with the washcoat provides a catalyst article wherein the rhodium is present at a loading of up to 20 g/ft$^3$ relative to the substrate. It is simple for the skilled person to plan the relative amounts of each component used in the method (e.g. of the washcoat and the substrate) accordingly in order to achieve such a desired rhodium loading.

Preferably, the rhodium-supporting support material particles have rhodium supported thereon at a concentration of from 0.3 to 3.5 wt. %, based on the weight of the rhodium-supporting support material particle.

The method preferably further comprises adding a binder to the washcoat prior to coating a substrate with the washcoat. Preferred binders are described elsewhere herein. Preferably, the method further comprises adding one or more of an acid, a base, a thickening agent and a reducing agent to the washcoat prior to coating a substrate with the washcoat.

Preferably, providing rhodium-supporting support material particles comprises supporting rhodium on support material particles using incipient wetness impregnation. Incipient wetness impregnation is a technique well-known to the skilled person. The skilled person would be able to perform an appropriate incipient wetness impregnation method without further direction.

Preferably, providing rhodium-supporting support material particles further comprises drying and calcining the rhodium-supporting support material particles. This drying and calcining step is preferably performed before formation of the washcoat.

After coating a substrate with the washcoat, the resulting catalyst article (or coated substrate) is preferably dried and/or calcined.

Preferably, the catalyst article of this aspect is according to the first aspect.

In a further aspect, the present invention provides a catalyst article obtained or obtainable by the method of the above aspect.

Surprisingly, when used in an emission treatment system, the catalyst article of this aspect, which has locally higher concentrations of rhodium as defined herein, but still a low overall loading of rhodium in order to reduce the use of PGMs, may exhibit significantly improved light-off performance {i.e. a lower light-off temperature, the temperature at which the conversion of a particular target species [NO$_x$, CO or total hydrocarbon (THC)] reaches 50%} compared with catalyst articles not having locally higher concentrations of rhodium. Moreover, having the locally higher concentrations of rhodium while maintaining low overall rhodium loading may result in larger particle sizes of rhodium on the rhodium supporting support material particles, which may surprisingly result in a catalyst article in which the rhodium particles are more resistant to sintering, oxidation and migration compared to other low-rhodium-loading catalyst articles. However, it has also been found that over concentrating the rhodium on the rhodium-supporting support material particles may then result in a reduction in catalytic activity. As such, there may be an optimal local rhodium concentration for a particular low total loading of rhodium.

The above effects may be particularly beneficial for catalyst articles having low total rhodium loading but may not be observed for catalyst articles having a higher total rhodium loading. Without wishing to be bound by theory, it is thought that this may be because when the total loading of rhodium relative to the support is already high, the local concentration of rhodium on each of the support material particles is already high, and therefore there may not be a need to locally concentrate the rhodium on a portion of the support material.

In a further aspect, the present invention provides an emission treatment system comprising the catalyst article described herein. Preferably, the emission treatment system is for a gasoline engine. Preferably, the gasoline engine operates under stoichiometric conditions.

In a further aspect, the present invention provides a method of treating an exhaust gas, the method comprising: providing the catalyst article described herein; and contacting the catalyst article with an exhaust gas. Preferably, the exhaust gas is from a gasoline engine. Preferably, the gasoline engine operates under stoichiometric conditions.

The invention will now be described in relation to the following non-limiting examples.

Manufacture of Catalyst Articles

A number of catalyst articles were prepared according to the following examples:

Reference Catalyst 1
1. A Rh Ceria Zirconia mixed oxide (CZO) pre-fixed powder was made by incipient wetness impregnation of the CZO with Rh nitrate solution to achieve 0.23 wt. % Rh concentration. The powder was dried at 80° C. overnight and calcined at 500° C. for 2 hours, followed by grinding.
2. A calculated amount of the ground Rh CZO pre-fixed powder was slurred, targeting 1.0 g/in$^3$ of CZO and 4 g/ft$^3$ Rh, respectively.
3. The slurry was blended with a 4% La—Al$_2$O$_3$ slurry targeting 1.0 g/in$^3$ loading. This was continuously mixed.
4. The solids were adjusted and the washcoat thickened.
5. A substrate was coated with the washcoat (4) targeting 50%-55% dose length from one side at first. Dried to 80% or greater moisture removal by hot air. Then coat the other side the substrate targeting to a 50%-55% dose length, followed by drying again and calcination.

Inventive Catalyst 1
1. A Rh Ceria Zirconia mixed oxide (CZO) pre-fixed powder was made by incipient wetness impregnation of the CZO with Rh nitrate solution to achieve 0.75 wt. % Rh concentration. The powder was dried at 80° C. overnight and calcined at 500° C. for 2 hours, followed by grinding.
2. A calculated amount of the ground Rh CZO pre-fixed powder was slurred, targeting 0.3 g/in$^3$ of CZO and 4 g/ft$^3$ Rh, respectively.
3. An extra quantity of CZO slurry of 0.7 g/in$^3$ was added to make the total CZO equivalent to Reference Catalyst 1 (1.0 g/in$^3$). In this washcoat, Rh was locally concentrated on about 31% of the CZO support and the rest of the CZO support is free of Rh. This was continuously mixed.
4. The slurry was blended with a 4% La—Al$_2$O$_3$ slurry targeting 1.0 g/in$^3$ loading. This was continuously mixed.
5. The solids were adjusted and the washcoat thickened.
6. A substrate was coated with the washcoat (5) targeting 50%-55% dose length from one side at first. Dried to 80% or greater moisture removal by hot air. Then coat the other side the substrate targeting to a 50%-55% dose length, followed by drying again and calcination.

Inventive Catalyst 2
1. A Rh Ceria Zirconia mixed oxide (CZO) pre-fixed powder was made by incipient wetness impregnation of the CZO with Rh nitrate solution to achieve 1.5 wt. % Rh concentration. The powder was dried at 80° C. overnight and calcined at 500° C. for 2 hours, followed by grinding.
2. A calculated amount of the ground Rh CZO pre-fixed powder was slurred, targeting 0.15 g/in$^3$ of CZO and 4 g/ft$^3$ Rh, respectively.
3. An extra quantity of CZO slurry of 0.85 g/in$^3$ was added to make the total CZO equivalent to Reference Catalyst 1 (1.0 g/in$^3$). In this washcoat, Rh was locally concentrated on about 15% of the CZO support and the rest of the CZO support is free of Rh. This was continuously mixed.
4. The slurry was blended with a 4% La—Al$_2$O$_3$ slurry targeting 1.0 g/in$^3$ loading. This was continuously mixed.
5. The solids were adjusted and the washcoat thickened.
6. A substrate was coated with the washcoat (5) targeting 50%-55% dose length from one side at first. Dried to 80% or greater moisture removal by hot air. Then coat the other side the substrate targeting to a 50%-55% dose length, followed by drying again and calcination.

Inventive Catalyst 3
1. A Rh Ceria Zirconia mixed oxide (CZO) pre-fixed powder was made by incipient wetness impregnation of the CZO with Rh nitrate solution to achieve 3 wt. % Rh concentration. The powder was dried at 80° C. overnight and calcined at 500° C. for 2 hours, followed by grinding.
2. A calculated amount of the ground Rh CZO pre-fixed powder was slurred, targeting 0.08 g/in$^3$ of CZO and 4 g/ft$^3$ Rh, respectively.
3. An extra quantity of CZO slurry of 0.92 g/in$^3$ was added to make the total CZO equivalent to Reference Catalyst 1 (1.0 g/in$^3$). In this washcoat, Rh was locally concentrated on about 8% of the CZO support and the rest of the CZO support is free of Rh. This was continuously mixed.
4. The slurry was blended with a 4% La—Al$_2$O$_3$ slurry targeting 1.0 g/in$^3$ loading. This was continuously mixed.
5. The solids were adjusted and the washcoat thickened.
6. A substrate was coated with the washcoat (5) targeting 50%-55% dose length from one side at first. Dried to 80% or greater moisture removal by hot air. Then coat the other side the substrate targeting to a 50%-55% dose length, followed by drying again and calcination.

Reference Catalyst 2
1. A Rh La-stabilized alumina pre-fixed powder was made by incipient wetness impregnation of the La-stabilized alumina (La—Al$_2$O$_3$) with Rh nitrate solution to achieve 0.2 wt. % Rh concentration. The powder was dried at 80° C. overnight and calcined at 500° C. for 2 hours, followed by grinding.
2. A calculated amount of the ground Rh La—Al$_2$O$_3$ pre-fixed powder was slurred, targeting 1.0 g/in$^3$ of La—Al$_2$O$_3$ and 4 g/ft$^3$ Rh, respectively.
3. The slurry was blended with a Ceria-Zirconia mixed oxide (CZO) slurry targeting 1.0 g/in$^3$ loading. This was continuously mixed.
4. The solids were adjusted and the washcoat thickened.
5. A substrate was coated with the washcoat (4) targeting 50%-55% dose length from one side at first. Dried to 80% or greater moisture removal by hot air. Then coat the other side the substrate targeting to a 50%-55% dose length, followed by drying again and calcination.

Inventive Catalyst 4
1. A Rh La-stabilized alumina pre-fixed powder was made by incipient wetness impregnation of the La-stabilized alumina (La—$Al_2O_3$) with Rh nitrate solution to achieve 0.75 wt. % Rh concentration. The powder was dried at 80° C. overnight and calcined at 500° C. for 2 hours, followed by grinding.
2. A calculated amount of the ground Rh La—$Al_2O_3$ pre-fixed powder was slurred, targeting 0.3 g/in$^3$ of La—$Al_2O_3$ and 4 g/ft$^3$ Rh, respectively.
3. An extra quantity of La—$Al_2O_3$ slurry of 0.7 g/in$^3$ was added to make the total La—$Al_2O_3$ equivalent to Reference Catalyst 2 (1.0 g/in$^3$). In this washcoat, Rh was locally concentrated on about 31% of the La—$Al_2O_3$ support and the rest of the La—$Al_2O_3$ support is free of Rh. This was continuously mixed.
4. The slurry was blended with a Ceria-Zirconia mixed oxide (CZO) slurry targeting 1.0 g/in$^3$ loading. This was continuously mixed.
5. The solids were adjusted and the washcoat thickened.
6. A substrate was coated with the washcoat (5) targeting 50%-55% dose length from one side at first. Dried to 80% or greater moisture removal by hot air. Then coat the other side the substrate targeting to a 50%-55% dose length, followed by drying again and calcination.

Inventive Catalyst 5
1. A Rh La-stabilized alumina pre-fixed powder was made by incipient wetness impregnation of the La-stabilized alumina (La—$Al_2O_3$) with Rh nitrate solution to achieve 1.5 wt. % Rh concentration. The powder was dried at 80° C. overnight and calcined at 500° C. for 2 hours, followed by grinding with a mortar and pestle.
2. A calculated amount of the ground Rh La—$Al_2O_3$ pre-fixed powder was slurred, targeting 0.15 g/in$^3$ of La—$Al_2O_3$ and 4 g/ft$^3$ Rh, respectively.
3. An extra quantity of La—$Al_2O_3$ slurry of 0.85 g/in$^3$ was added to make the total La—$Al_2O_3$ equivalent to Reference Catalyst 2 (1.0 g/in$^3$). In this washcoat, Rh was locally concentrated on about 15% of the La—$Al_2O_3$ support and the rest of the La—$Al_2O_3$ support is free of Rh. This was continuously mixed.
4. The slurry was blended with a Ceria-Zirconia mixed oxide (CZO) slurry targeting 1.0 g/in$^3$ loading. This was continuously mixed.
5. The solids were adjusted and the washcoat thickened.
6. A substrate was coated with the washcoat (5) targeting 50%-55% dose length from one side at first. Dried to 80% or greater moisture removal by hot air. Then coat the other side the substrate targeting to a 50%-55% dose length, followed by drying again and calcination.

Inventive Catalyst 6
1. A Rh La-stabilized alumina pre-fixed powder was made by incipient wetness impregnation of the La-stabilized alumina (La—$Al_2O_3$) with Rh nitrate solution to achieve 3 wt. % Rh concentration. The powder was dried at 80° C. overnight and calcined at 500° C. for 2 hours, followed by grinding.
2. A calculated amount of the ground Rh La—$Al_2O_3$ pre-fixed powder was slurred, targeting 0.08 g/in$^3$ of La—$Al_2O_3$ and 4 g/ft$^3$ Rh, respectively.
3. An extra quantity of La—$Al_2O_3$ slurry of 0.92 g/in$^3$ was added to make the total La—$Al_2O_3$ equivalent to Reference Catalyst 2 (1.0 g/in$^3$). In this washcoat, Rh was locally concentrated on about 8% of the La—$Al_2O_3$ support and the rest of the La—$Al_2O_3$ support is free of Rh. This was continuously mixed.
4. The slurry was blended with a Ceria-Zirconia mixed oxide (CZO) slurry targeting 1.0 g/in$^3$ loading. This was continuously mixed.
5. The solids were adjusted and the washcoat thickened.
6. A substrate was coated with the washcoat (5) targeting 50%-55% dose length from one side at first. Dried to 80% or greater moisture removal by hot air. Then coat the other side the substrate targeting to a 50%-55% dose length, followed by drying again and calcination.

Reference Catalyst 3
1. A Rh La-stabilized alumina pre-fixed powder was made by incipient wetness impregnation of the La-stabilized alumina (La—$Al_2O_3$) with Rh nitrate solution to achieve 0.5 wt. % Rh concentration. The powder was dried at 80° C. overnight and calcined at 500° C. for 2 hours, followed by grinding.
2. A calculated amount of the ground Rh La—$Al_2O_3$ pre-fixed powder was slurred, targeting 1.3 g/in$^3$ of La—$Al_2O_3$ and 10 g/ft$^3$ Rh, respectively.
3. The slurry was blended with a Ceria-Zirconia mixed oxide (CZO) slurry targeting 1.0 g/in$^3$ loading. This was continuously mixed.
4. The solids were adjusted and the washcoat thickened.
5. A substrate was coated with the washcoat (4) targeting 50%-55% dose length from one side at first. Dried to 80% or greater moisture removal by hot air. Then coat the other side the substrate targeting to a 50%-55% dose length, followed by drying again and calcination.

Inventive Catalyst 7
1. A Rh La-stabilized alumina pre-fixed powder was made by incipient wetness impregnation of the La-stabilized alumina (La—$Al_2O_3$) with Rh nitrate solution to achieve 0.9 wt. % Rh concentration. The powder was dried at 80° C. overnight and calcined at 500° C. for 2 hours, followed by grinding.
2. A calculated amount of the ground Rh La—$Al_2O_3$ pre-fixed powder was slurred, targeting 0.6 g/in$^3$ of La—$Al_2O_3$ and 10 g/ft$^3$ Rh, respectively.
3. An extra quantity of La—$Al_2O_3$ slurry of 0.6 g/in$^3$ was added to make the total La—$l_2O_3$ equivalent to Reference Catalyst 3 (1.3 g/in$^3$). In this washcoat, Rh was locally concentrated on about 50% of the La—$Al_2O_3$ support and the rest of the La—$Al_2O_3$ support is free of Rh. This was continuously mixed.
4. The slurry was blended with a Ceria-Zirconia mixed oxide (CZO) slurry targeting 1.0 g/in$^3$ loading. This was continuously mixed.
5. The solids were adjusted and the washcoat thickened.
6. A substrate was coated with the washcoat (5) targeting 50%-55% dose length from one side at first. Dried to 80% or greater moisture removal by hot air. Then coat the other side the substrate targeting to a 50%-55% dose length, followed by drying again and calcination.

Inventive Catalyst 8
1. A Rh La-stabilized alumina pre-fixed powder was made by incipient wetness impregnation of the La-stabilized alumina (La—$Al_2O_3$) with Rh nitrate solution to achieve 1.9 wt. % Rh concentration. The powder was dried at 80° C. overnight and calcined at 500° C. for 2 hours, followed by grinding with a mortar and pestle.
2. A calculated amount of the ground Rh La—$Al_2O_3$ pre-fixed powder was slurried, targeting 0.3 g/in$^3$ of La—$Al_2O_3$ and 10 g/ft$^3$ Rh, respectively.
3. An extra quantity of La—$Al_2O_3$ slurry of 1.0 g/in$^3$ was added to make the total La—$Al_2O_3$ equivalent to Reference Catalyst 3 (1.3 g/in$^3$). In this washcoat, Rh was locally concentrated on about 25% of the La—$Al_2O_3$ support and the rest of the La—Al$_2$O$_3$ support is free of Rh. This was continuously mixed.
4. The slurry was blended with a Ceria-Zirconia mixed oxide (CZO) slurry targeting 1.0 g/in$^3$ loading. This was continuously mixed.
5. The solids were adjusted and the washcoat thickened.
6. A substrate was coated with the washcoat (5) targeting 50%-55% dose length from one side at first. Dried to 80% or greater moisture removal by hot air. Then coat the other side the substrate targeting to a 50%-55% dose length, followed by drying and calcination.

Reference Catalyst 4

Bottom layer washcoat was prepared by:
1. Milled and made a slurry containing 4% La$_2$O$_3$ doped alumina.
2. Milled and made a slurry containing a ceria and zirconia mixed oxide (CZO).
3. Blended the two slurries together.
4. Add barium hydroxide and palladium nitrate to the slurry (3)
5. Adjust the solids of the washcoat (4) and thicken it with rheology modifier.
6. The final compositions of the bottom layer washcoat contains La—Al$_2$O$_3$ 1.0 g/in$^3$, ceria zirconia composite 1.0 g/in$^3$, Ba element 400 g/ft$^3$, and Pd element 149 g/ft$^3$.
7. A substrate was coated with the washcoat (6) targeting 50%-55% dose length from one side at first. Dried to 80% or greater moisture removal by hot air. Then coat the other side the substrate targeting to a 50%-55% dose length, followed by drying again and calcination.

Top layer washcoat was prepared by:
1. Milled and made a slurry containing La-stabilized alumina (La—Al$_2$O$_3$).
2. A calculated amount rhodium nitrate solution was added to the slurry (1), targeting 1.0 g/in$^3$ of La—Al$_2$O$_3$ and 6 g/ft$^3$ Rh, respectively.
3. pH of the slurry (2) was increased to 6~7 with ammonia, resulting the Rh local concentration of 0.35%.
4. The slurry (3) was blended with a pre-milled Ceria-Zirconia mixed oxide (CZO) slurry, targeting 1.0 g/in$^3$ loading. This was continuously mixed.
5. The solids of the washcoat (4) was adjusted and thicken with rheology modifier.
6. The final compositions of the top layer washcoat contain 4% La$_2$O$_3$-doped alumina 1.0 g/in$^3$, ceria zirconia composite 1.0 g/in$^3$, and Rh element 6 g/ft$^3$.
7. The washcoat (5) was applied onto the bottom layer coated brick, targeting 50%-55% dose length from one side at first. Dried to 80% or greater moisture removal by hot air. Then coated the other side, targeting to a 50%-55% dose length, followed by drying again and calcination, resulting the finished catalytic article.

Figure 2A:
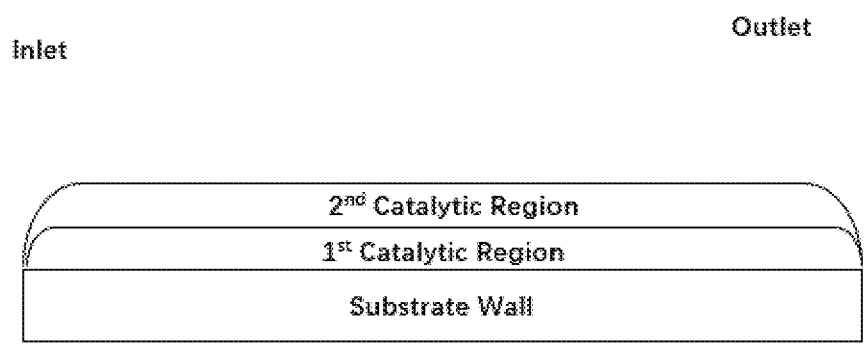
FIG. 2a shows one embodiment according to the present invention, the first catalytic region extends 100% of the axial length L, as bottom layer; the second catalytic region extends 100% of the axial length L, as top layer.
Figure 2B:
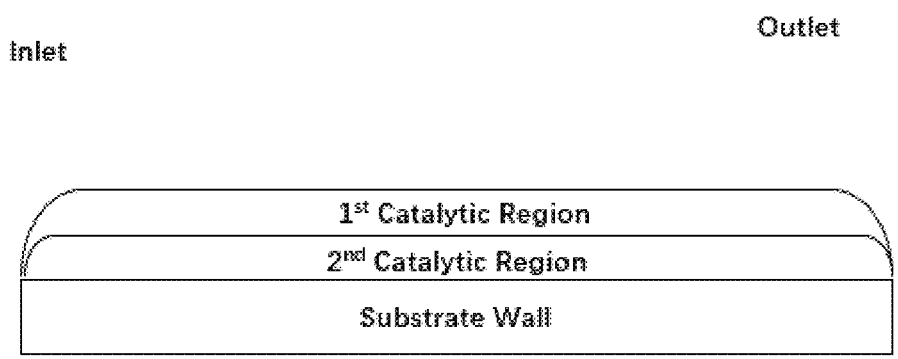

Inventive Catalyst 9 (e.g., see FIG. 2b)

Bottom layer washcoat (second catalytic region in FIG. 2b) was prepared and coated the same way as Reference Catalyst 4 bottom layer.

Top layer washcoat (first catalytic region in FIG. 2b) was prepared by:
1. Milled and made a slurry containing La-stabilized alumina (La—Al$_2$O$_3$).
2. A calculated amount rhodium nitrate solution was added to the slurry (1), targeting 0.35 g/in$^3$ of La—Al$_2$O$_3$ and 6 g/ft$^3$ Rh, respectively.
3. pH of the slurry (2) was increased to 6~7 with ammonia.
4. An extra quantity of La—Al$_2$O$_3$ slurry of 0.65 g/in$^3$ was added to make the total La—Al$_2$O$_3$ equivalent to Reference Catalyst 4 (1.0 g/in$^3$). In this washcoat, Rh was locally concentrated on about 35% of the La—Al$_2$O$_3$ support with a concentration of 1% and the rest of the La—Al$_2$O$_3$ support is free of Rh. This was continuously mixed.
5. The slurry (4) was blended with a pre-milled Ceria-Zirconia mixed oxide (CZO) slurry, targeting 1.0 g/in$^3$ loading. This was continuously mixed.
6. The solids of the washcoat (5) was adjusted and thicken with rheology modifier.
7. The final compositions of the top layer washcoat are the same as Reference catalyst 4, containing 4% La$_2$O$_3$-doped alumina 1.0 g/in$^3$, ceria zirconia composite 1.0 g/in$^3$, and Rh element 6 g/ft$^3$.
8. The washcoat (7) was applied onto the bottom layer coated brick, targeting 50%-55% dose length from one side at first. Dried to 80% or greater moisture removal by hot air. Then coated the other side, targeting to a 50%-55% dose length, followed by drying again and calcination, resulting the finished catalytic article.

Figure 4A:
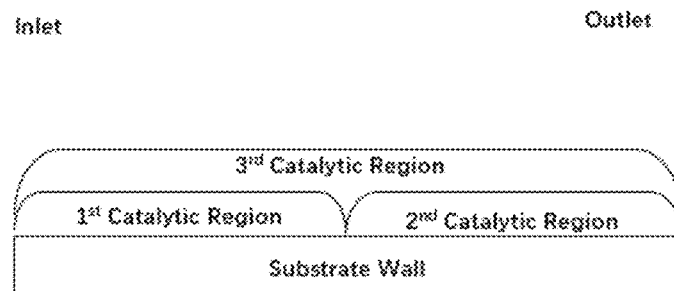
FIG. 4a shows one embodiment according to the present invention, the first catalytic region extends less than 100% of the axial length L, from the inlet end; the second catalytic region extends less than 100% of the axial length L, from the outlet end. The total length of the second and the first catalytic region is less than or equal to the axial length L. The $3^{rd}$ catalytic region extends 100% of the axial length L and overlies the first and second catalytic regions as top layer.
Figure 4B:
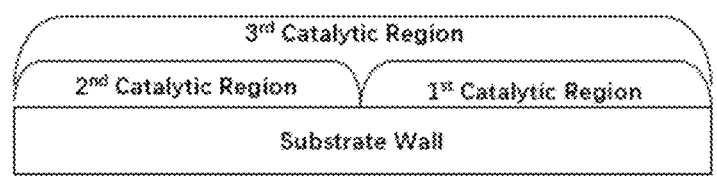
Figure 4C:
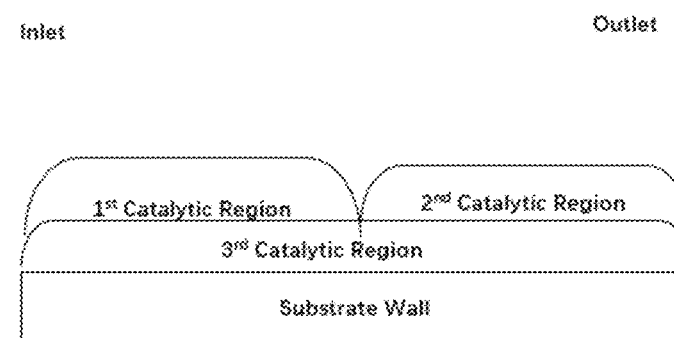
FIG. 4c shows one embodiment according to the present invention, the $3^{rd}$ catalytic region extends 100% of the axial length L as bottom layer. The first catalytic region extends less than 100% of the axial length L, from the inlet end; the second catalytic region extends less than 100% of the axial length L, from the outlet end. The total length of the second and the first catalytic region is less than or equal to the axial length L.
Figure 4D:
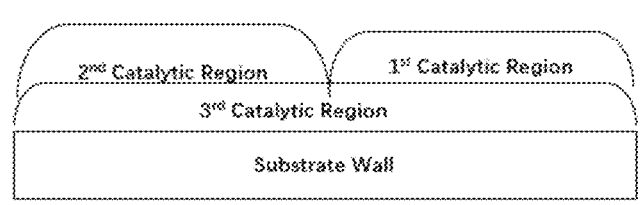
FIG. 4d depicts a variation of FIG. 4c.
Figure 5A:
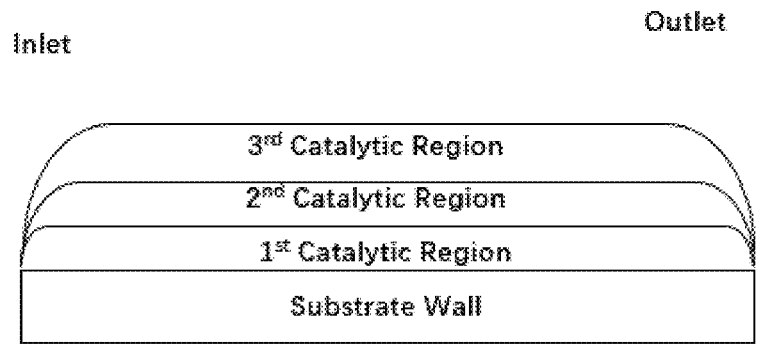
FIG. 5a shows one embodiment according to the present invention, the first catalytic region extends 100% of the axial length L, as bottom layer; the second catalytic region extends 100% of the axial length L, as middle layer; and the third catalytic region extends 100% of the axial length L, as top layer.
Figure 5B:
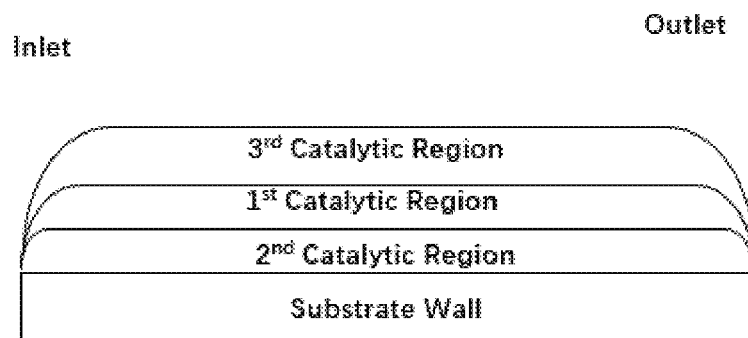
Figure 5C:
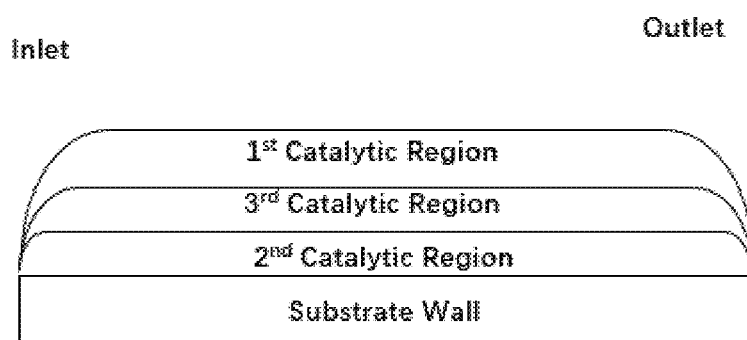
Figure 6A:
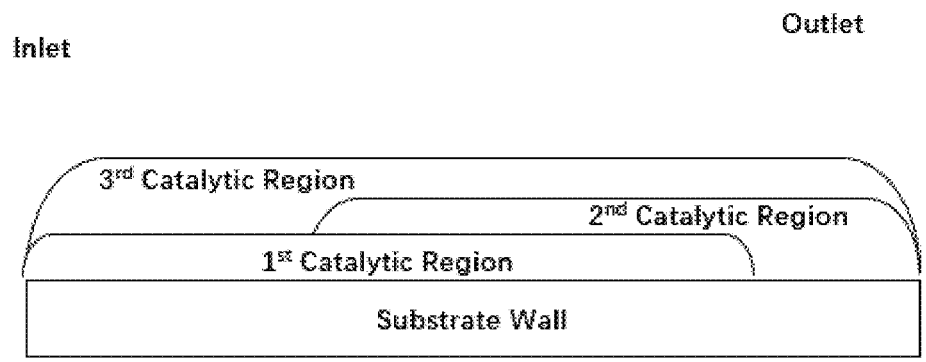
FIG. 6a shows one embodiment according to the present invention, the first catalytic region extends less than 100% of the axial length L, from the inlet end; the second catalytic region extends less than 100% of the axial length L, from the outlet end. The total length of the second and the first catalytic region is greater than the axial length L. The $3^{rd}$ catalytic region extends 100% of the axial length L and overlies the first and second catalytic regions as top layer.
Figure 6B:
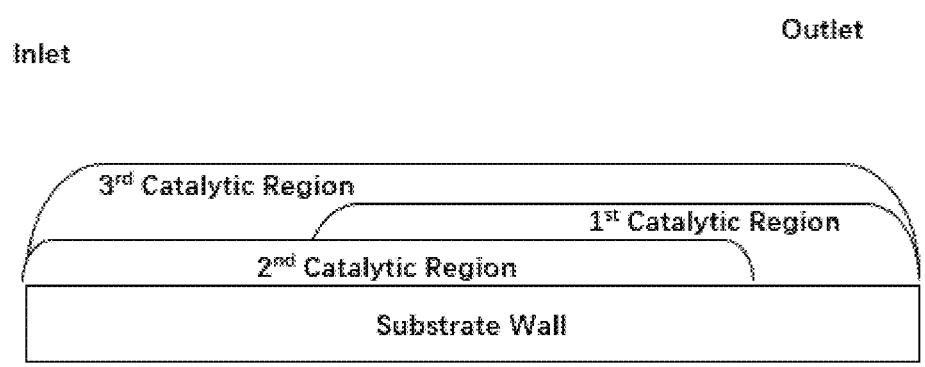
Figure 6C:
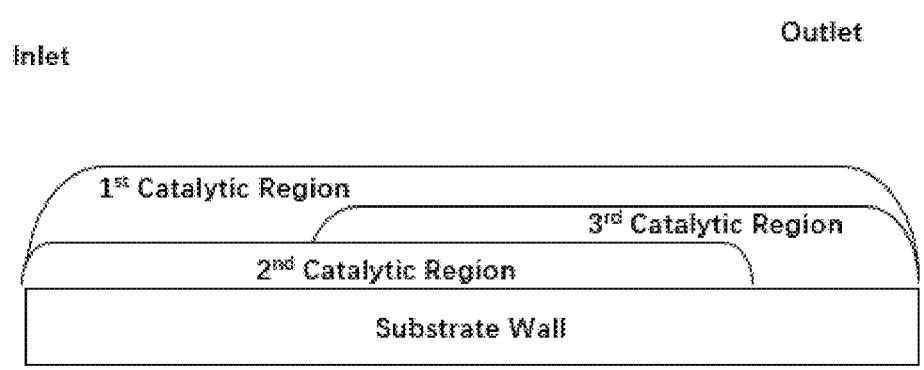
Figure 6D:
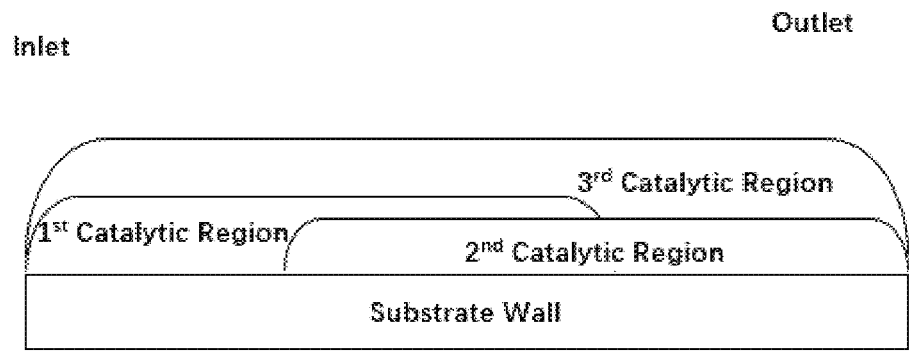
Figure 6E:
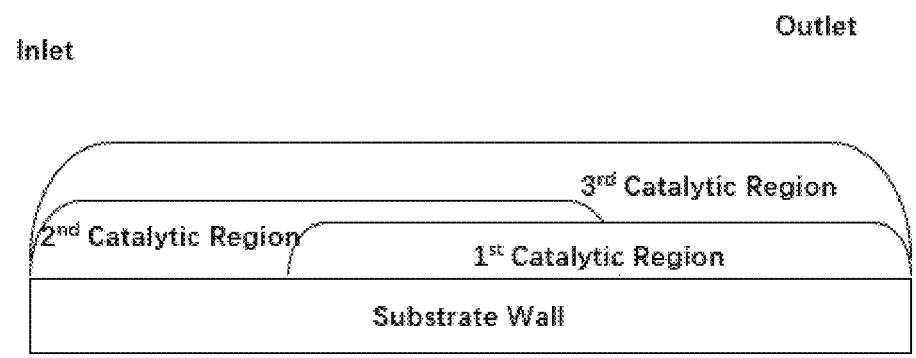
Figure 6F:
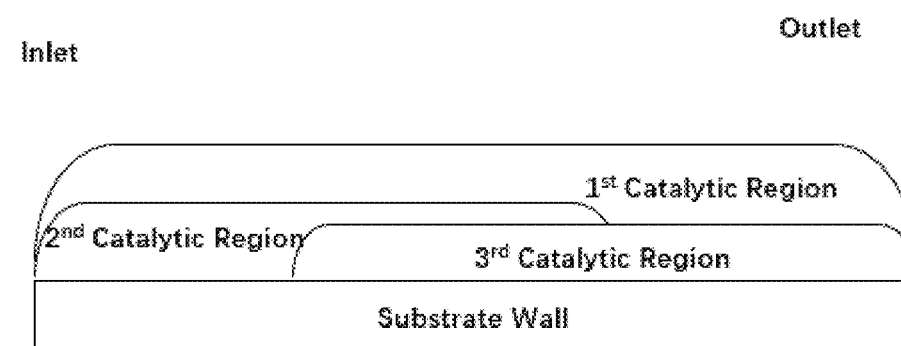
Figure 6G:
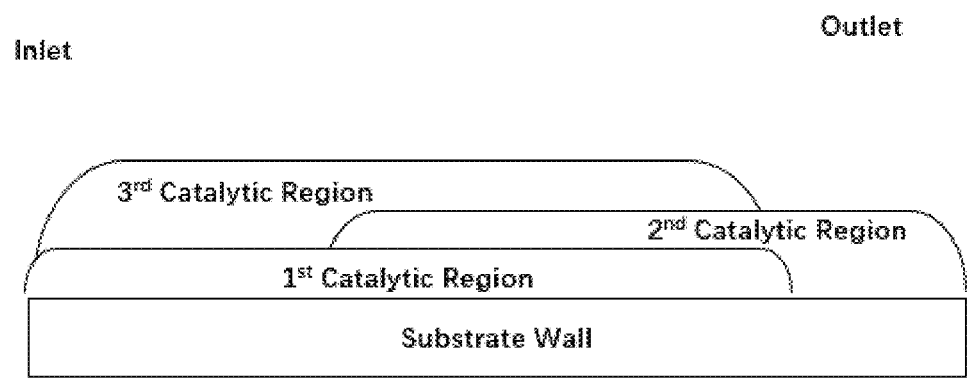
FIG. 6g shows one embodiment according to the present invention, the first catalytic region extends less than 100% of the axial length L, from the inlet end; the second catalytic region extends less than 100% of the axial length L, from the outlet end. The total length of the second and the first catalytic region can be less than, equal to, or greater than the axial length L. The $3^{rd}$ catalytic region extends less than 100% of the axial length L from the inlet end and at least partially overlies the first and/or second catalytic regions.
Figure 6H:
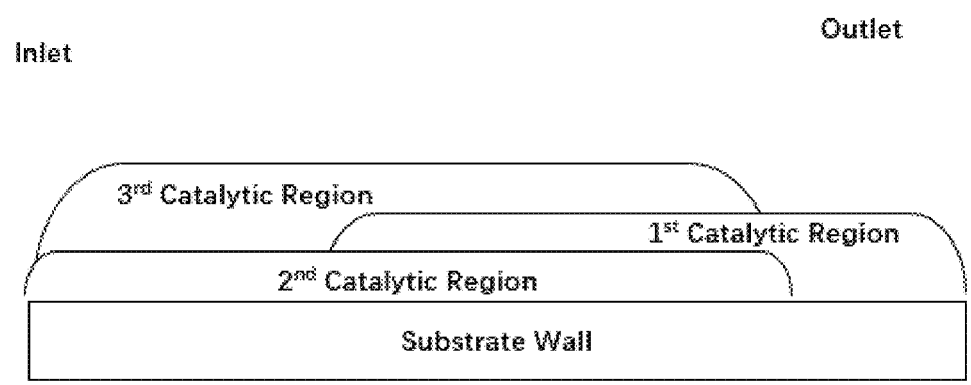
FIGS. 6h and 6i depict variations of FIG. 6g.
Figure 6I:
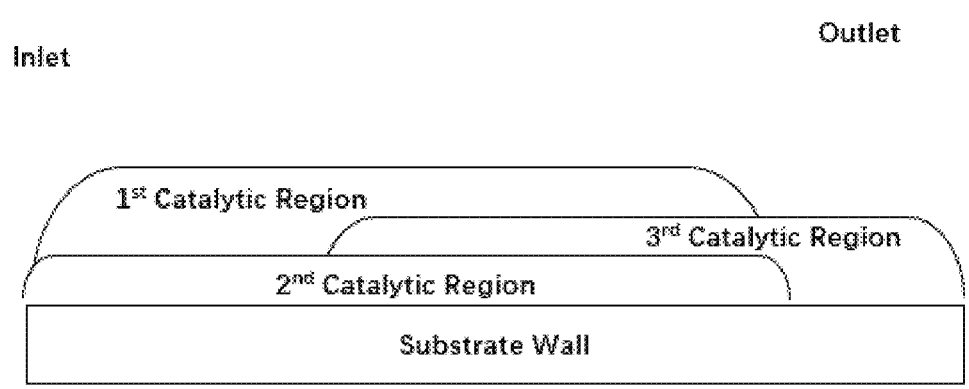
Figure 6J:
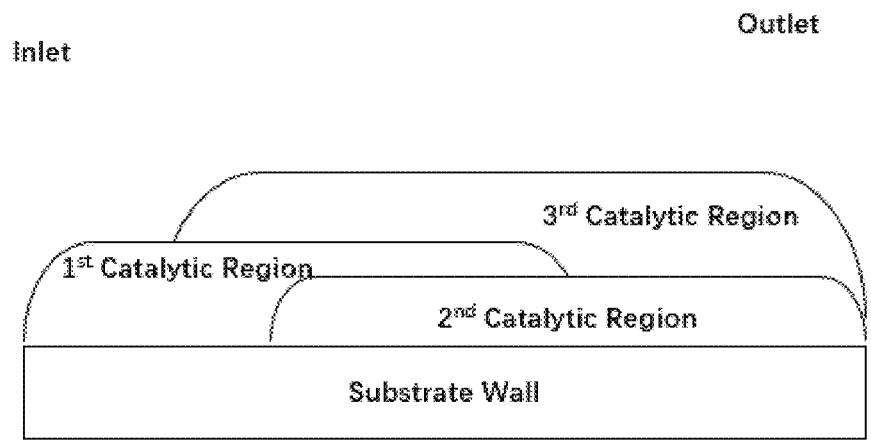
FIG. 6j shows one embodiment according to the present invention, the first catalytic region extends less than 100% of the axial length L, from the inlet end; the second catalytic region extends less than 100% of the axial length L, from the outlet end. The total length of the second and the first catalytic region can be less than, equal to, or greater than the axial length L. The $3^{rd}$ catalytic region extends less than 100% of the axial length L from the outlet end and at least partially overlies the second and/or first catalytic regions.
Figure 6K:
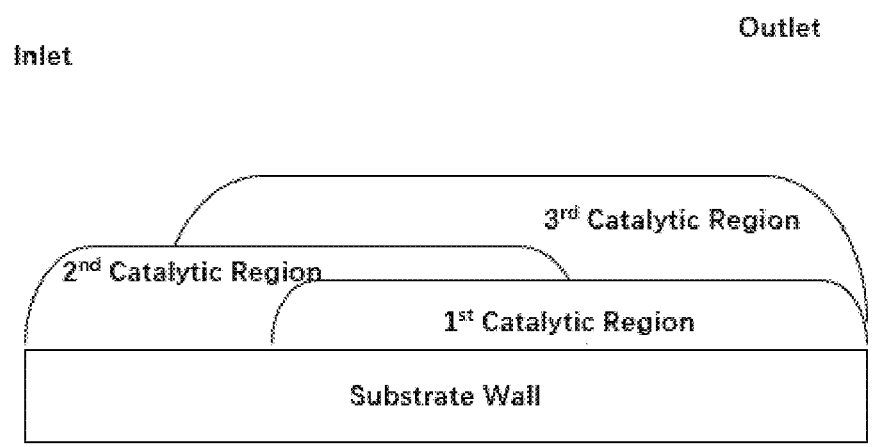
FIGS. 6k and 6l depict variations of FIG. 6j.
Figure 6L:
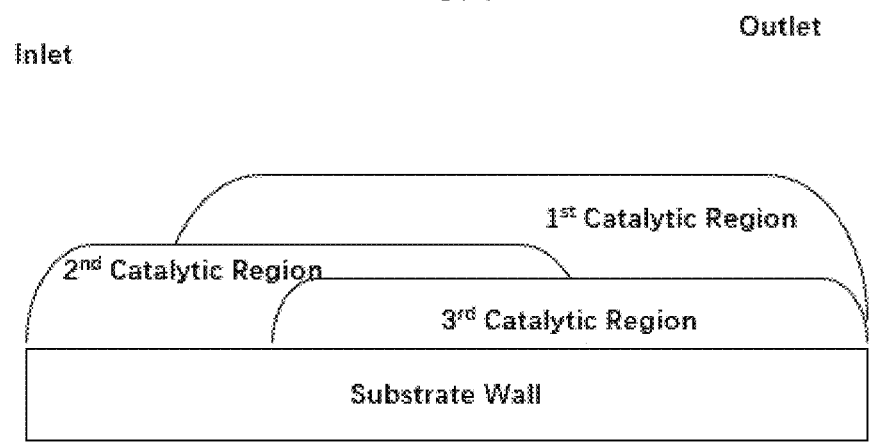

Inventive Catalyst 10 with a Zoned Configuration (e.g., See FIG. 4d)

Bottom layer washcoat (third catalytic region in FIG. 4d) was prepared and coated the same way as Reference Catalyst 4 bottom layer.

Top layer of Inventive Catalyst 10 has a zoned configuration.

The inlet zone washcoat (second catalytic region in FIG. 4d) was prepared by the same way as Reference Catalyst 4 top layer washcoat. Then the washcoat was applied onto the bottom layer coated brick, targeting 50%-55% dose length from inlet side. Dried to 80% or greater moisture removal by hot air.

The outlet zone washcoat (first catalytic region in FIG. 4d) was prepared by the same way as Inventive Catalyst 9 top layer washcoat. Then the washcoat was applied onto the bottom layer coated brick, targeting 50%-55% dose length from outlet side. Dried to 80% or greater moisture removal by hot air. Finally, calcine the brick, resulting the finished catalytic article.

Inventive Catalyst 11 with a Zoned Configuration (e.g., See FIG. 4d)

Bottom layer washcoat (third catalytic region in FIG. 4d) was prepared and coated the same way as Reference Catalyst 4 bottom layer.

Top layer of Inventive Catalyst 11 has a zoned configuration.

The inlet zone washcoat (second catalytic region in FIG. 4d) was prepared by the same way as Reference Catalyst 4 top layer washcoat. Then the washcoat was applied onto the bottom layer coated brick, targeting 50%-55% dose length from inlet side. Dried to 80% or greater moisture removal by hot air.

The outlet zone washcoat (first catalytic region in FIG. 4d) was prepared by:
1. Milled and made a slurry containing Ceria-Zirconia mixed oxide (CZO).
2. A calculated amount rhodium nitrate solution was added to the slurry (1), targeting 0.35 g/in$^3$ of CZO and 6 g/ft$^3$ Rh, respectively.
3. pH of the slurry (2) was increased to 6~7 with ammonia.
4. An extra quantity of Ceria-Zirconia mixed oxide (CZO) slurry of 0.65 g/in$^3$ was added to make the total Ceria-Zirconia mixed oxide (CZO) equivalent to Reference Catalyst 4 (1.0 g/in$^3$). In this washcoat, Rh was locally concentrated on about 35% of the Ceria-Zirconia mixed oxide (CZO) support with a concentration of 1% and the rest of the Ceria-Zirconia mixed oxide (CZO) support is free of Rh. This was continuously mixed.
5. The slurry (4) was blended with a pre-milled La—Al$_2$O$_3$ slurry, targeting 1.0 g/in$^3$ loading. This was continuously mixed.
6. The solids of the washcoat (5) was adjusted and thicken with rheology modifier.
7. The final compositions of the top layer washcoat are the same as Reference catalyst 4, containing 4% La$_2$O$_3$-doped alumina 1.0 g/in$^3$, ceria zirconia composite 1.0 g/in$^3$, and Rh element 6 g/ft$^3$.
8. Then the washcoat (7) was applied onto the bottom layer coated brick, targeting 50%-55% dose length from outlet side. Dried to 80% or greater moisture removal by hot air. Finally, calcine the brick, resulting the finished catalytic article.

Reference Catalyst 5

Bottom layer washcoat was prepared by:
1. Milled and made a slurry containing 4% La$_2$O$_3$ doped alumina.
2. Milled and made a slurry containing a ceria and zirconia mixed oxide (CZO).
3. Blended the two slurries together.
4. Add barium hydroxide and palladium nitrate to the slurry (3)
5. Adjust the solids of the washcoat (4) and thicken it with rheology modifier.
6. The final compositions of the bottom layer washcoat contains La—Al$_2$O$_3$ 0.9 g/in$^3$, ceria zirconia composite 0.9 g/in$^3$, Ba element 300 g/ft$^3$, and Pd element 36 g/ft$^3$.
7. A substrate was coated with the washcoat (6) targeting 50%-55% dose length from one side at first. Dried to 80% or greater moisture removal by hot air. Then coat the other side the substrate targeting to a 50%-55% dose length, followed by drying again and calcination.

Top layer washcoat was prepared by
1. Milled and made a slurry containing La-stabilized alumina (La—Al$_2$O$_3$).
2. Milled and made a slurry containing a ceria and zirconia mixed oxide (CZO).
3. Blending the two slurries together with the weight ratio of La—Al$_2$O$_3$ to CZO kept at 1:3
4. A calculated amount rhodium nitrate solution was added to the slurry (3), targeting 0.4 g/in$^3$ of La—Al$_2$O$_3$, 1.1 g/in$^3$ of CZO and 4 g/ft$^3$ Rh, respectively.
5. pH of the slurry (4) was increased to 6~7 with ammonia, resulting the Rh local concentration of 0.15%.
6. The solids of the washcoat (5) were adjusted and thicken with rheology modifier.
7. The final compositions of the top layer washcoat contain 4% La$_2$O$_3$-doped alumina 1.0 g/in$^3$, ceria zirconia composite 1.0 g/in$^3$, and Rh element 6 g/ft$^3$.
8. The washcoat (5) was applied onto the bottom layer coated brick, targeting 50%-55% dose length from one side at first. Dried to 80% or greater moisture removal by hot air. Then coated the other side, targeting to a 50%-55% dose length, followed by drying again and calcination, resulting the finished catalytic article.

Inventive Catalyst 12 (e.g., See FIG. 2b)

Bottom layer washcoat (second catalytic region in FIG. 2b) was prepared and coated the same way as Reference Catalyst 5 bottom layer.

Top layer washcoat (first catalytic region in FIG. 2b) was prepared by:
1. Milled and made a slurry containing La-stabilized alumina (La—Al$_2$O$_3$).
2. Milled and made a slurry containing a ceria and zirconia mixed oxide (CZO).
3. Blending the two slurries together with the weight ratio of La—Al$_2$O$_3$ to CZO kept at 1:3
4. A calculated amount rhodium nitrate solution was added to the partial slurry (3), targeting 0.2 g/in$^3$ of La—Al$_2$O$_3$, 0.6 g/in$^3$ of CZO and 4 g/ft$^3$ Rh, respectively. The obtained slurry was continuously mixed.
5. pH of the slurry (4) was increased to 6~7 with ammonia for Rh hydrolysis, resulting the Rh local concentration of 0.31%, This was continuously mixed
6. An extra quantity of slurry 3 containing La—Al$_2$O$_3$ slurry of 0.2 g/in$^3$ and CZO slurry of 0.6 g/in$^3$ was added to make the total La—Al$_2$O$_3$ and CZO equivalent to Reference Catalyst 5 (1.0 g/in$^3$). In this washcoat, Rh was locally concentrated on about 50% of the mixed La—Al$_2$O$_3$ and CZO support with a concentration of 0.3% and the rest of the mixed of La—Al$_2$O$_3$ and CZO support is free of Rh. This was continuously mixed.
7. The solids of the washcoat (5) were adjusted and thicken with rheology modifier.
8. The final compositions of the top layer washcoat are the same as Reference Catalyst 5, containing 4% La$_2$O$_3$-doped alumina 0.4 g/in$^3$, ceria zirconia composite 1.1 g/in$^3$, and Rh element 4 g/ft$^3$.
9. The washcoat (7) was applied onto the bottom layer coated brick, targeting 50%-55% dose length from one side at first. Dried to 80% or greater moisture removal by hot air. Then coated the other side, targeting to a 50%-55% dose length, followed by drying again and calcination, resulting the finished catalytic article.

Inventive Catalyst 13 (e.g., see FIG. 2b)

Bottom layer washcoat (second catalytic region in FIG. 2b) was prepared and coated the same way as Reference Catalyst 4 bottom layer.

Top layer washcoat (first catalytic region in FIG. 2b) was prepared by:
1. Milled and made a slurry containing La-stabilized alumina (La—Al$_2$O$_3$).
2. Milled and made a slurry containing a ceria and zirconia mixed oxide (CZO).
3. Blending the two slurries together with the weight ratio of La—Al$_2$O$_3$ to CZO kept at 1:3
4. A calculated amount rhodium nitrate solution was added to the partial slurry (3), targeting 0.1 g/in$^3$ of La—Al$_2$O$_3$, 0.3 g/in$^3$ of CZO and 4 g/ft$^3$ Rh, respectively. The obtained slurry was continuously mixed.
5. pH of the slurry (4) was increased to 6~7 with ammonia for Rh hydrolysis, resulting the Rh local concentration of 0.6%, This was continuously mixed
6. An extra quantity of slurry 3 containing La—Al$_2$O$_3$ slurry of 0.3 g/in$^3$ and CZO slurry of 0.8 g/in$^3$ was added to make the total La—Al$_2$O$_3$ and CZO equivalent to Reference Catalyst 5 (1.5 g/in$^3$). In this washcoat, Rh was locally concentrated on about 25% of the mixed La—Al$_2$O$_3$ and CZO support with a concentration of 0.6% and the rest of the mixed of La—Al$_2$O$_3$ and CZO support is free of Rh. This was continuously mixed.
7. The solids of the washcoat (5) were adjusted and thicken with rheology modifier.

8. The final compositions of the top layer washcoat are the same as Reference Catalyst 5, containing 4% $La_2O_3$-doped alumina 0.4 g/in$^3$, ceria zirconia composite 1.2 g/in$^3$, and Rh element 4 g/ft$^3$.

9. The washcoat (7) was applied onto the bottom layer coated brick, targeting 50%-55% dose length from one side at first. Dried to 80% or greater moisture removal by hot air. Then coated the other side, targeting to a 50%-55% dose length, followed by drying again and calcination, resulting the finished catalytic article.

All the catalysts are listed in Table 1 with the corresponding Rh local concentration, targeted support, and total Rh loading.

TABLE 1

Summary of all the catalysts

| Catalysts | Rh local concentration | Targeted support | Total Rh loading g/ft$^3$ |
|---|---|---|---|
| Reference Catalyst 1 | 0.23% | CZO | 4 |
| Inventive Catalyst 1 | 0.75% | CZO | 4 |
| Inventive Catalyst 2 | 1.5% | CZO | 4 |
| Inventive Catalyst 3 | 3% | CZO | 4 |
| Reference Catalyst 2 | 0.23% | La—Al$_2$O$_3$ | 4 |
| Inventive Catalyst 4 | 0.75% | La—Al$_2$O$_3$ | 4 |
| Inventive Catalyst 5 | 1.5% | La—Al$_2$O$_3$ | 4 |
| Inventive Catalyst 6 | 3% | La—Al$_2$O$_3$ | 4 |
| Reference Catalyst 3 | 0.46% | La—Al$_2$O$_3$ | 10 |
| Inventive Catalyst 7 | 0.98% | La—Al$_2$O$_3$ | 10 |
| Inventive Catalyst 8 | 1.86% | La—Al$_2$O$_3$ | 10 |
| Reference Catalyst 4 Top layer | 0.35% | La—Al$_2$O$_3$ | 6 |
| Inventive Catalyst 9 Top layer | 1% | La—Al$_2$O$_3$ | 6 |
| Inventive Catalyst 10 Top layer front zone | 0.35% | La—Al$_2$O$_3$ | 6 |
| Inventive Catalyst 10 Top layer rear zone | 1% | La—Al$_2$O$_3$ | 6 |
| Inventive Catalyst 10 Top layer rear zone | 0.35% | La—Al$_2$O$_3$ | 6 |
| Inventive Catalyst 11 Top layer rear zone | 1% | CZO | 6 |
| Reference Catalyst 5 Top layer | 0.15% | La—Al$_2$O$_3$ and CZO | 4 |
| Inventive Catalyst 12 Top layer | 0.31% | La—Al$_2$O$_3$ and CZO | 4 |
| Inventive Catalyst 13 Top layer | 0.62% | La—Al$_2$O$_3$ and CZO | 4 |

Example 1: FE-EPMA Analysis of Rh and Zr or Al Interaction

Characterization of Rh nanoparticles at very low Rh loading is a very challenging task. HRTEM is the most used technique by so far. However, because of the very fine Rh particle size it is difficult to identify those Rh particles and the standard deviation (error) is huge. Moreover, if Rh is supported on CZO, the contrast between Rh and Zr are very close, making the distinction of Rh particles from support impossible. $H_2$-TPR is another frequently used technique to measure the Rh support interaction or Rh "relative" particle size. However, Rh and Ce can both be reduced simultaneous by $H_2$, and it is impossible to separate them from one another. For CO chemisorption method, CO can only be chemisorbed on Rh$^0$ in Rh/Al$_2$O$_3$ and Rh/CZO. CO uptake is negligible on non-reduced Rh samples. Typically, Rh species in the as-made TWC catalyst is in oxidation status (Rh$_2$O$_3$), implying that it is impossible for measuring the as-made Rh dispersion by CO chemisorption. There likely exists an overestimation of the metal particle dispersion by measuring the CO chemisorption of Rh/CZO, due to the formation of carbonate species on CeO$_2$ surface even at low temperature (323 K) and by the likelihood of multiple CO molecules adsorbing on the Rh itself. In this Invention, we developed a method to effectively exam Rh dispersion on either CZO or La—Al$_2$O$_3$ support at very low loadings (0.23% on single support or 4 g/ft$^3$ in TWC formulation).

The Pearson correlation coefficients (product moment correlation coefficient) are calculated based on the results of area analysis by FE-EPMA, and Rh—Zr or Rh—Al correlation coefficients are listed in Table 2.

Figure 28:
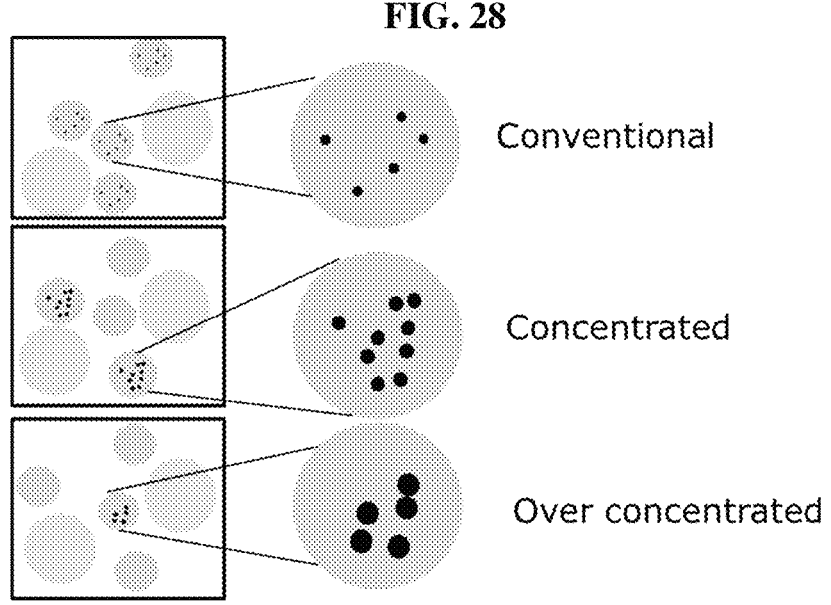
FIG. 28 illustrates the concept of locally concentrating Rh on a portion of the support material to enlarge Rh particle size.

Reference Catalyst 1 with 4 g/ft$^3$ of Rh pre-fixed on all of the CZO support shows a high coefficient of 0.5, indicating very high Rh dispersion and very fine Rh particles. In contrast, Inventive Catalyst 1 and Inventive Catalyst 2 demonstrate lower Rh—Zr Coefficient than Reference catalyst 1. This means that Rh particle sizes may be successfully enlarged by concentrating Rh on a portion of the CZO support of 31% or 15%, respectively, even though the total Rh loading is kept the same. Further increasing Rh local concentration to 3% by fixing Rh on 7.7% of the total CZO material led to a substantially low Rh—Zr coefficient of 0.17. In this case, Rh is over-aggregated and Rh dispersion is too low. Hypothetically, some of Rh atoms might not be utilized due to being buried inside the Rh particles. This concept is well illustrated in FIG. 28.

Similar trend of Rh local concentration and Rh—Al Pearson Correlation Coefficient are observed on Reference Catalyst 2 and Inventive Catalyst 4, 5 and 6 with 4 g/ft$^3$ of Rh pre-fixed on La—Al$_2$O$_3$ support. Locally concentrating Rh to 3% by fixing Rh on 7.7% of the total La—Al$_2$O$_3$ material (Inventive Catalyst 6) led to a substantially low Rh—Al coefficient of 0.17. In this case, Rh is over-aggregated and Rh dispersion is too low. Hypothetically, some of Rh atoms might not be utilized due to being buried inside the Rh particles. In contrast, Inventive Catalyst 5 by concentrating Rh on 15% of La—Al$_2$O$_3$ support demonstrates a reasonable Pearson Correlation Coefficient of 0.43, leading an optimal Rh nanoparticle size or Rh dispersion hypothetically.

When total Rh loading increases to 10 g g/ft$^3$, the relationship between Rh local concentration and Pearson Correlation Coefficient becomes much flatter, as demonstrated with Reference Catalyst 3, Inventive Catalyst 7 and Inventive Catalyst 8, where Pearson Correlation Coefficients plateau at 0.38~0.36 when local Rh concentration increases from 0.46% to 1.86%. This technique is not sensitive enough at high Rh loading cases.

TABLE 2

Pearson Correlation Coefficient by EPMA

| Catalysts | Rh local concentration | Targeted support | Pearson Correlation Coefficient Rh—Zr | Pearson Correlation Coefficient Rh—Al |
|---|---|---|---|---|
| Reference Catalyst 1 | 0.23% | CZO | 0.5 | |
| Inventive Catalyst 1 | 0.75% | CZO | 0.45 | |
| Inventive Catalyst 2 | 1.5% | CZO | 0.33 | |
| Inventive Catalyst 3 | 3% | CZO | 0.17 | |
| Reference Catalyst 2 | 0.23% | La—Al$_2$O$_3$ | | |
| Inventive Catalyst 4 | 0.75% | La—Al$_2$O$_3$ | | |
| Inventive Catalyst 5 | 1.5% | La—Al$_2$O$_3$ | | 0.43 |
| Inventive Catalyst 6 | 3% | La—Al$_2$O$_3$ | | 0.17 |
| Reference Catalyst 3 | 0.46% | La—Al$_2$O$_3$ | | 0.38 |
| Inventive Catalyst 7 | 0.98% | La—Al$_2$O$_3$ | | 0.37 |
| Inventive Catalyst 8 | 1.86% | La—Al$_2$O$_3$ | | 0.36 |

Example 2: Light Off Performances Test in Engine Testing

All catalysts were engine bench aged for 100 hours with stoic/fuel cut aging cycles targeting peak temperature of catalyst bed at 1000° C. and tested over a gasoline engine. The light-off performance is a typical condition with a gas volumetric space velocity of 216 K/hr, temperature ramp is 20° C./min, the lambda of Air and Fuel Ratio (AFR) is perturbed at 14.56 with 0.5 amplitude and 1 Hz frequency. The catalyst inlet temperature is reduced until THC, CO and $NO_x$ conversions are less than 10%. Stabilize for 2 Minutes. Catalyst inlet temperature is increased 20° C. per minute until inlet temperature reaches 500 C. The conversions of $NO_x$, CO, THC were calculated by comparing the concentration of the feed gas and the gas at the outlets of the catalysts.

$T_{50}$ is the temperature when the conversion reaches 50%, which is typically used to compare catalytic performances. The lower $T_{50}$, the better the catalyst. The $T_{50}$ light off temperatures of all catalysts are listed in Table 3. The data show clearly that both Inventive Catalyst 1 and Inventive Catalyst 2 of the present invention give significantly improved light-off performance compared with the Reference Catalyst 1, both of which exhibiting ~30° C. lower $T_{50}$ for $NO_x$, ~33° C. lower $T_{50}$ for CO and ~30° C. lower $T_{50}$ for THC, respectively. The optimal size of Rh particles may therefore be more resistant to sintering and migration, resulting early light-off performance. Over-concentrating Rh in Inventive Catalyst 3, however, starts to deteriorate the catalytic activity, with a ~25° C. delay of all the three pollutants conversion when compared to Inventive Catalysts 1 and 2, although still improved compared to Reference Catalyst 1.

Similar light-off performance benefits are observed on Reference Catalyst 2 and Inventive Catalyst 4, 5 and 6 with 4 g/ft³ of Rh pre-fixed on La—Al₂O₃ support. When Rh locally concentrating on a portion of La—Al₂O₃ support of 31% or 15%, respectively, Inventive Catalyst 4 and Inventive Catalyst 5 clearly show the substantially improved light-off performance compared with Reference Catalyst 2, possibly due to optimal size of Rh particles which may be more resistant to sintering and migration. Again, over-concentrating Rh in Inventive Catalyst 3, however, starts to decrease the conversions of all the three pollutants compared to Inventive Catalysts 1 and 2, although still improved compared to Reference Catalyst 1.

Interestingly, when Rh total loading is 10 g/ft³, Inventive Catalyst 7 does not show light-off performance benefit comparing to Reference Catalyst 3. It could be that Rh particle size/Rh dispersion is already in the optimal level in Reference Catalyst 3 with Rh local concentration of 0.46% for light-off test condition. Further concentrating Rh to 1.86% in Inventive Catalyst 8 becomes detrimental.

TABLE 3

Engine Bench Light-Off Test Results

| Catalysts | Rh local concentration | Total Rh loading (g/ft³) | $T_{50}$ (° C.) $NO_x$ | $T_{50}$ (° C.) CO | $T_{50}$ (° C.) THC |
|---|---|---|---|---|---|
| Reference Catalyst 1 | 0.23% | 4 | 390 | 402 | 404 |
| Inventive Catalyst 1 | 0.75% | 4 | 360 | 369 | 374 |
| Inventive Catalyst 2 | 1.5% | 4 | 360 | 368 | 373 |
| Inventive Catalyst 3 | 3% | 4 | 385 | 394 | 397 |
| Reference Catalyst 2 | 0.23% | 4 | 398 | 410 | 411 |
| Inventive Catalyst 4 | 0.75% | 4 | 383 | 393 | 397 |
| Inventive Catalyst 5 | 1.5% | 4 | 382 | 390 | 395 |
| Inventive Catalyst 6 | 3% | 4 | 393 | 402 | 405 |
| Reference Catalyst 3 | 0.46% | 10 | 373 | 378 | 386 |
| Inventive Catalyst 7 | 0.98% | 10 | 372 | 381 | 388 |
| Inventive Catalyst 8 | 1.86% | 10 | 382 | 394 | 401 |

Example 3: Lambda Sweep Test in Engine Testing

All catalysts were engine bench aged for 100 hours with stoic/fuel cut aging cycles targeting peak temperature of catalyst bed at 1000° C. and tested over a gasoline engine. The lambda sweep test is a typical condition with a gas volumetric space velocity of 216K/hr, temperature fixed at 400° C., the lambda of Air and Fuel Ratio (AFR) sweeps from 15.5 to 13.5 with 0.5 amplitude perturbed during the sweep. The conversion of THC, CO and $NO_x$ were calculated from comparing the concentration of the feed gas and the gas at the outlets of the catalysts.

Figure 7:
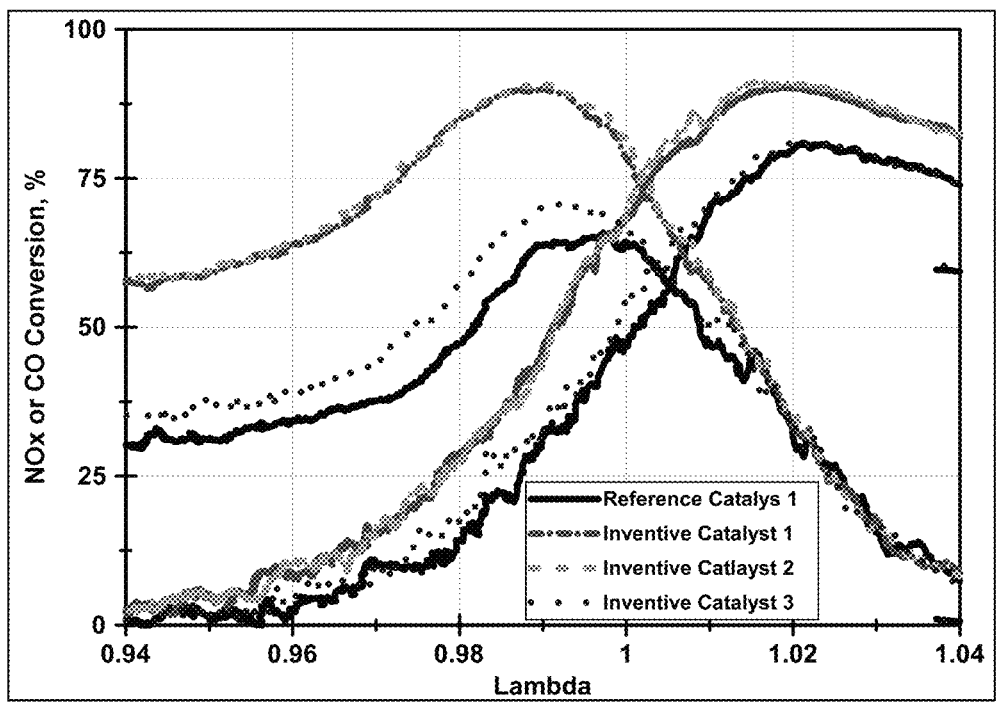
FIG. 7 shows the results of $NO_x$ and CO conversion of lambda sweep test at engine testing for Reference Catalyst 1 and Inventive Catalysts 1-3.
Figure 8:
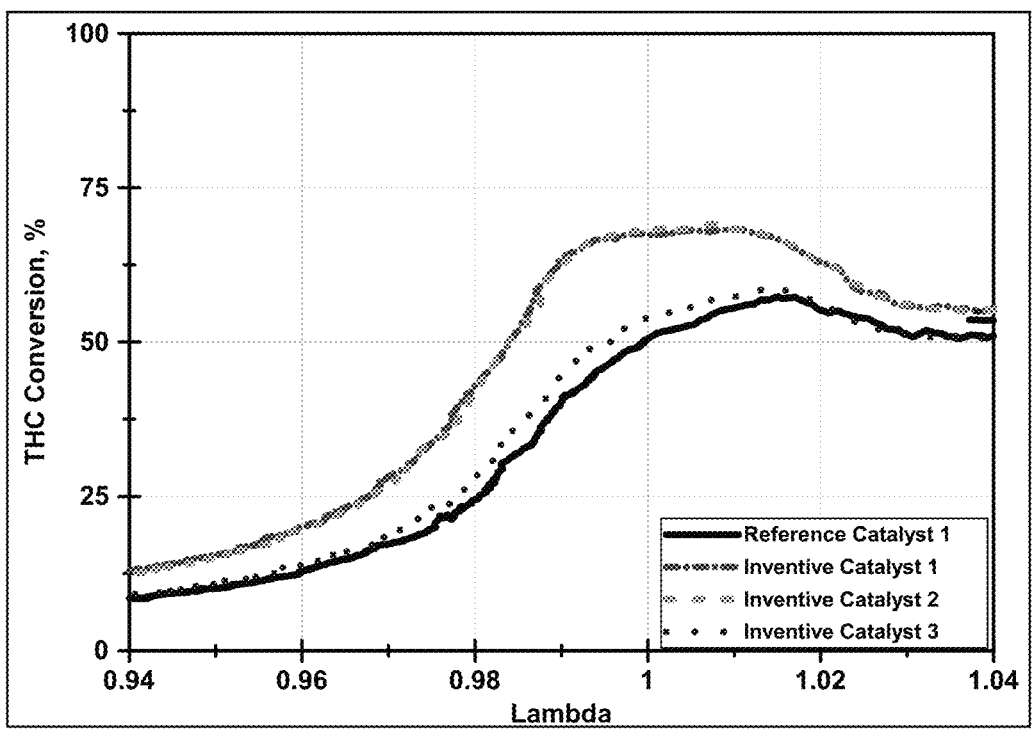
FIG. 8 shows the results of THC conversion of lambda sweep test at engine testing for Reference Catalyst 1 and Inventive Catalysts 1-3.

The CO and $NO_x$ conversion traces are shown in FIG. 7. The data clearly indicate that both Inventive Catalyst 1 and Inventive Catalyst 2 of the present invention give significantly improved $NO_x$ conversion and CO conversion within the entire range of lambda conditions. The THC conversion traces are shown in FIG. 8. Inventive Catalyst 1 and Inventive Catalyst 2 are both more active than Reference Catalysts 1 with higher THC conversion within the whole range of lambda conditions. Improved activity of the inventive catalysts is thought to be associated with the optimal size of Rh particles, which may therefore be more resistant to sintering and migration, resulting performance benefit. Over-concentrating Rh in Inventive Catalyst 3, however, starts to deteriorate the catalytic activity, with a significant drop of $NO_x$, CO and THC conversions compared to Inventive Catalysts 1 and 2, although still improved compared to Reference Catalyst 1.

Figure 9:
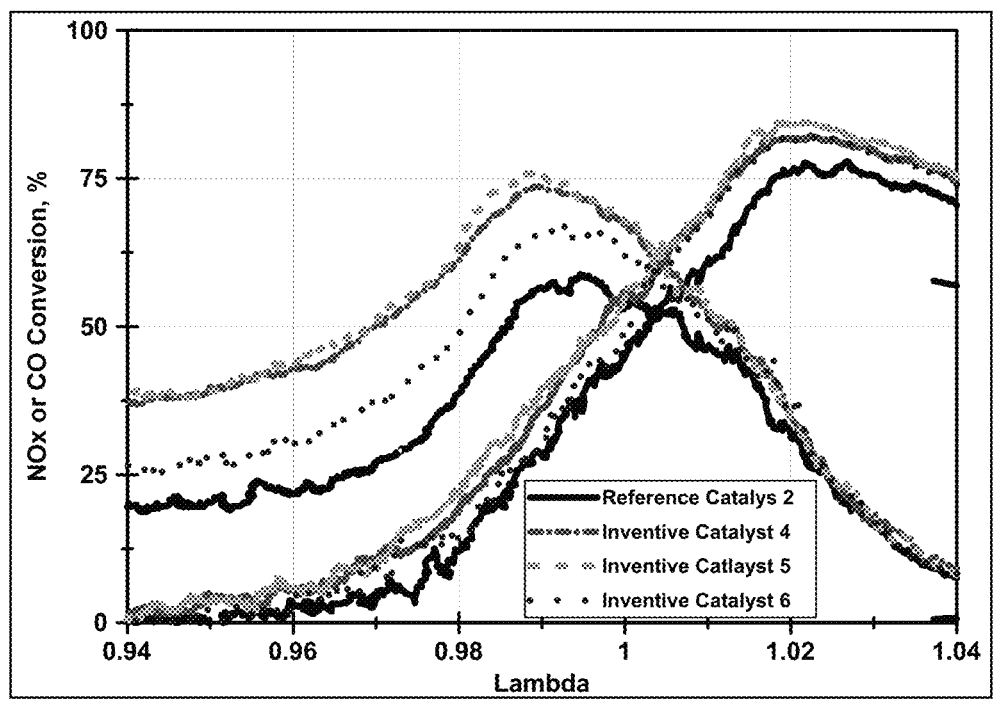
FIG. 9 shows the results of $NO_x$ and CO conversion of lambda sweep test at engine testing for Reference Catalyst 2 and Inventive Catalysts 4-6.
Figure 10:
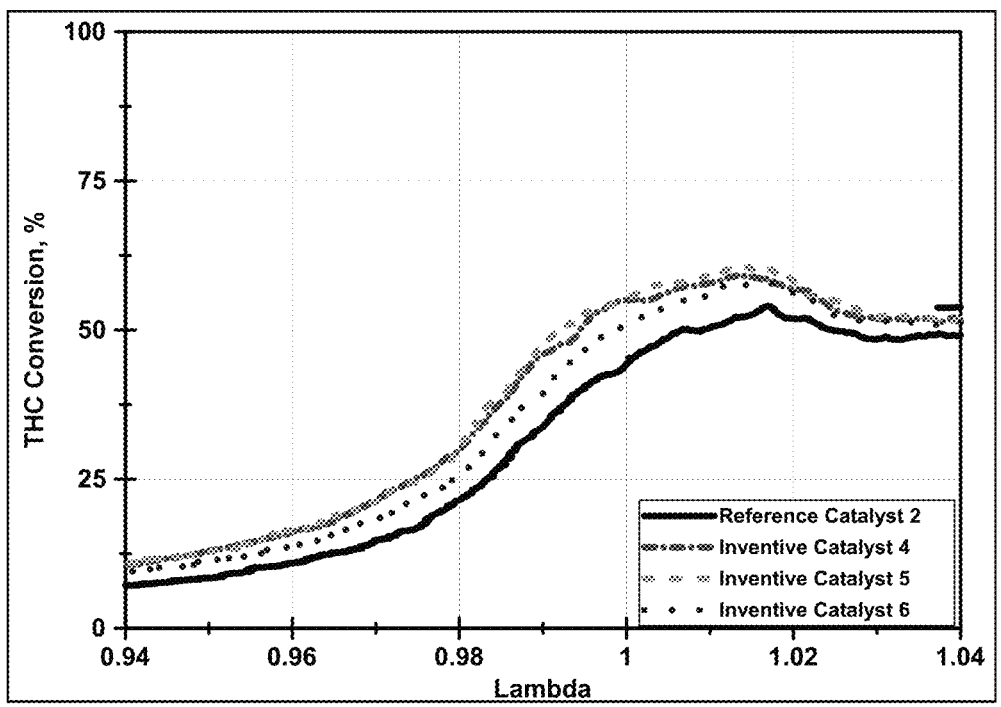
FIG. 10 shows the results of THC conversion of lambda sweep test at engine testing for Reference Catalyst 2 and Inventive Catalysts 4-6.

Similar lambda sweep performance benefits are observed on Reference Catalyst 2 and Inventive Catalysts 4-6 with 4 g/ft³ of Rh pre-fixed on La—Al₂O₃ support. The CO and $NO_x$ conversion traces are shown in FIG. 9. The THC conversion traces are shown in FIG. 10. When Rh locally concentrating on a portion of La—Al₂O₃ support of 31% or 15%, respectively, Inventive Catalyst 4 and Inventive Catalyst 5 clearly show the substantially improved conversions of $NO_x$, CO and THC at the entire lambda range compared with Reference Catalyst 2, possibly due to optimal size of Rh particles which may be more resistant to sintering and migration. Again, over-concentrating Rh in Inventive Catalyst 6, however, starts to decrease the conversions of all the three pollutants compared to Inventive Catalysts 4 and 5, although still improved compared to Reference Catalyst 2.

Figure 11:
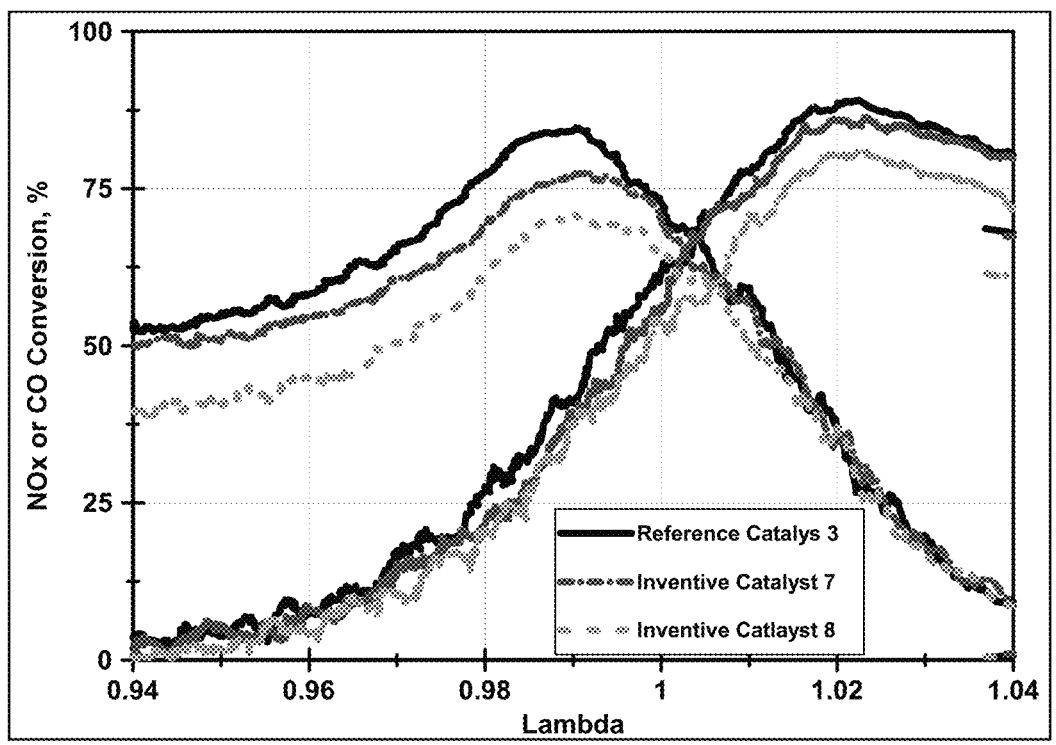
FIG. 11 shows the results of $NO_x$ and CO conversion of lambda sweep test at engine testing for Reference Catalyst 3, Inventive Catalyst 7, and Inventive Catalyst 8.
Figure 12:
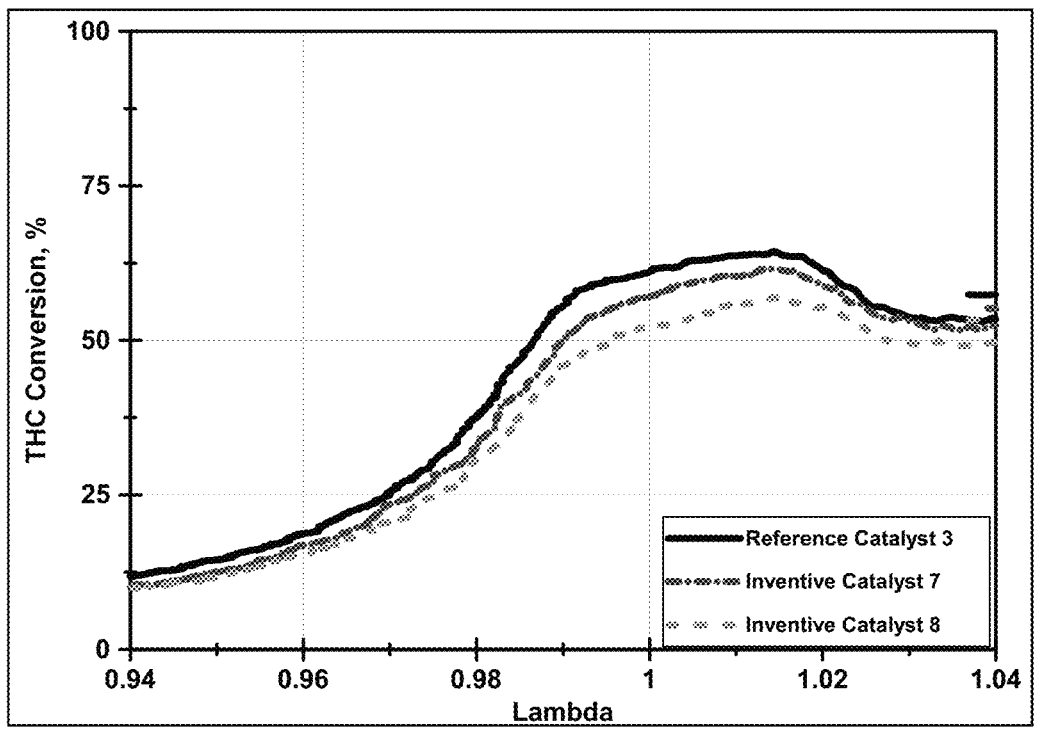
FIG. 12 shows the results of THC conversion of lambda sweep test at engine testing for Reference Catalyst 3, Inventive Catalyst 7, and Inventive Catalyst 8.

When Rh total loading is 10 g/ft³, neither Inventive Catalyst 7 nor Inventive Catalyst 8 show any lambda sweep performance benefit comparing to Reference Catalyst 3. The CO and $NO_x$ conversion traces are shown in FIG. 11. The THC conversion traces are shown in FIG. 12. It could be that Rh particle size/Rh dispersion is already in the optimal level in Reference Catalyst 3 with Rh local concentration of 0.46%. for lambda sweep test condition. Further concentrating Rh to either 0.93% or 1.86% in Inventive Catalyst 7 or 8 becomes detrimental for the test of lambda sweep at 400 C.

Example 4: Hot RDE Test in Engine Testing

All catalysts were engine bench aged for 100 hours with a stoic/fuel cut aging cycle, targeting a peak catalyst bed temperature of 1000° C. The catalysts were tested using a 2.0 L engine bench dynamometer performing a bespoke OEM designed real-world driving (RDE) cycle comprising acceleration and fuel shut-off conditions representing a cold urban, motorway and hot urban speed phases. The cycle length was 2700 seconds from ambient-soaked conditions, reaching an approximate peak catalyst bed temperature of 650° C. and 250 kg/h mass air flow rate. A cold RDE test was used as the pre-condition cycle. After that, three Hot RDE cycles were repeated with a 5-minute soak time in between. While the engine is at operating temperature, but the catalyst bed temperature is still hot. The advantage of running hot RDE with a cold RDE as pre-con is the very good reproducibility of Engine out emissions. $NO_x$, CO and THC emissions at post catalyst position were measured and accumulated mass of each species was calculated across the cycle. The averaged value of three hot RDE runs against time are plotted and shown in the figures below.

Figure 13:
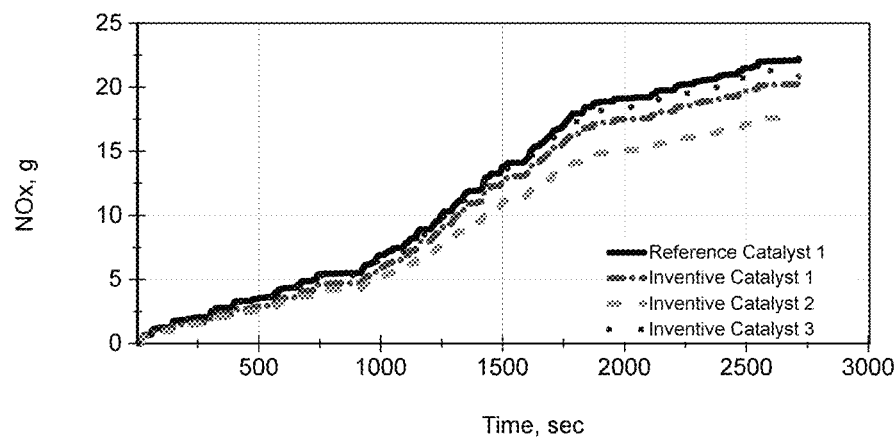
FIG. 13 shows the accumulated mass of $NO_x$ at post catalyst position during the Hot RDE test at engine testing for Reference Catalyst 1 and Inventive Catalysts 1-3.
Figure 14:
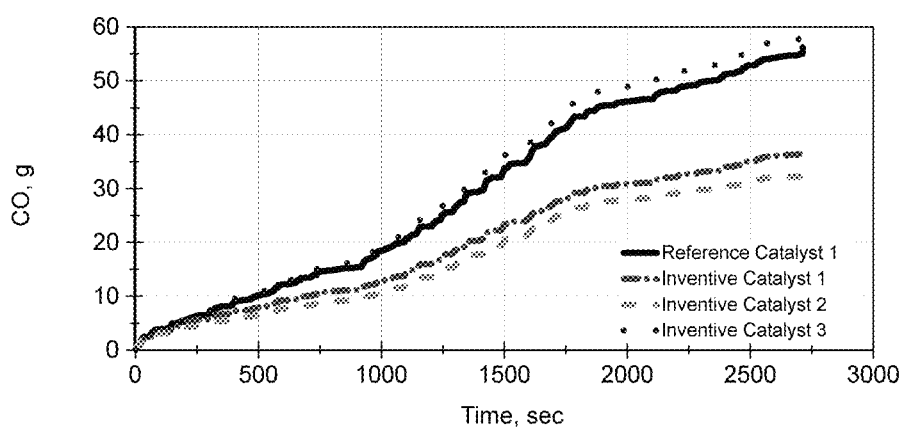
FIG. 14 shows the accumulated mass of CO at post catalyst position during the Hot RDE test at engine testing for Reference Catalyst 1 and Inventive Catalysts 1-3.
Figure 15:
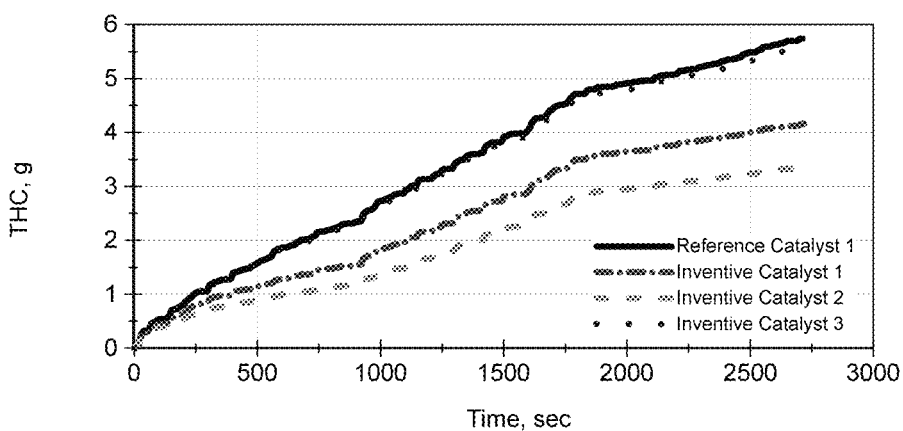
FIG. 15 shows the accumulated mass of THC at post catalyst position during the Hot RDE test at engine testing for Reference Catalyst 1 and Inventive Catalysts 1-3.

FIG. 13 compares the $NO_x$ emission of Reference Catalyst 1 and Inventive Catalysts 1-3 during the hot RDE cycle. The data show clearly that Inventive Catalyst 2 of the present invention gives the most significantly improved performance compared with the Reference Catalyst 1, which exhibiting ~5 g less of tailpipe $NO_x$ emissions. The optimal size of Rh particles at 1.5% Rh local concentration may therefore be the most resistant to sintering and migration, resulting the least $NO_x$ emissions. Less-concentrating Rh in Inventive Catalyst 1 or over-concentrating Rh in Inventive Catalyst 3, however, deteriorate the catalytic activity, with ~2.5 or 3.5 g more $NO_x$ emission when compared to Inventive Catalyst 2, although still less than Reference Catalyst 1. CO and THC emission are shown in FIG. 14 and FIG. 15, respectively. Inventive Catalyst 1 and Inventive Catalyst 2 both clearly show the substantially improved performance compared with Reference Catalyst 1, possibly due to optimal size of Rh particles which may be more resistant to sintering and migration. Again, over-concentrating Rh in Inventive Catalyst 3, however, starts to decrease the conversions of CO and THC compared to Inventive Catalyst 1.

Figure 16:
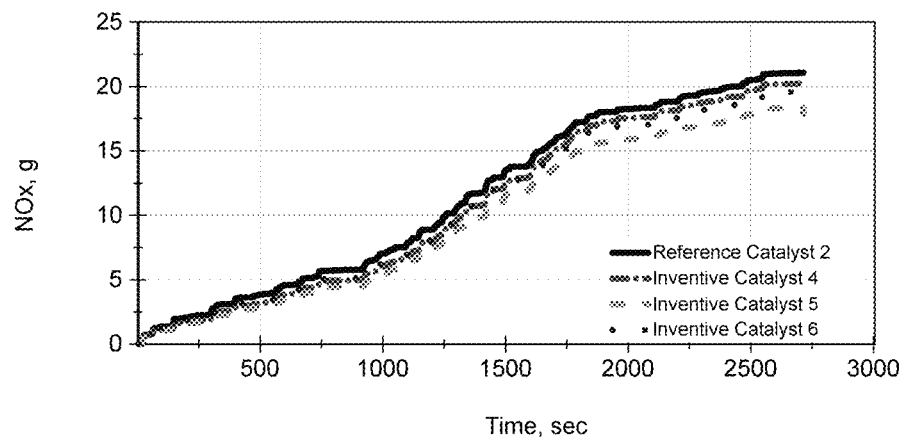
FIG. 16 shows the accumulated mass of $NO_x$ at post catalyst position during the Hot RDE test at engine testing for Reference Catalyst 2 and Inventive Catalysts 4-6.
Figure 17:
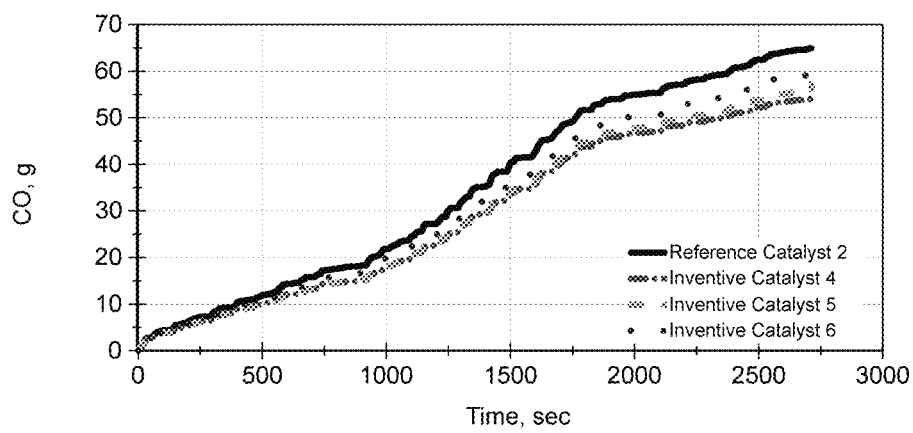
FIG. 17 shows the accumulated mass of CO at post catalyst position during the Hot RDE test at engine testing for Reference Catalyst 2 and Inventive Catalysts 4-6.
Figure 18:
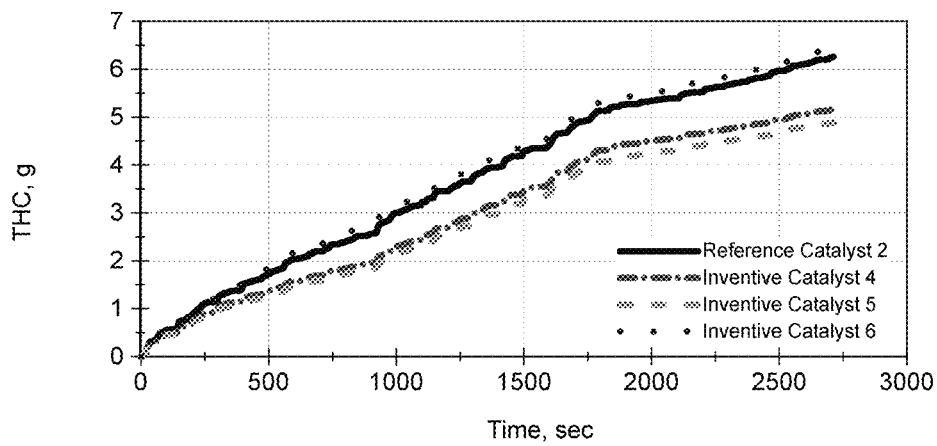
FIG. 18 shows the accumulated mass of THC at post catalyst position during the Hot RDE test at engine testing for Reference Catalyst 2 and Inventive Catalysts 4-6.

Similar performance benefits were observed on Reference Catalyst 2 and Inventive Catalysts 4-6 with 4 g/ft³ of Rh pre-fixed on La—$Al_2O_3$ support. When Rh locally concentrating on a portion of La—$Al_2O_3$ support of 31% or 15%, respectively, Inventive Catalyst 4 and Inventive Catalyst 5 clearly show the substantially improved CO (FIG. 17) and THC (FIG. 18) emission control compared with Reference Catalyst 2, possibly due to optimal size of Rh particles which may be more resistant to sintering and migration. Over-concentrating Rh in Inventive Catalyst 6, however, starts to decrease the performance compared to Inventive Catalysts 4 and 5. There are still benefits of $NO_x$ emission control on all the three Rh concentrated formulations as shown in FIG. 16, although it is not as obvious as CO and THC.

Figure 19:
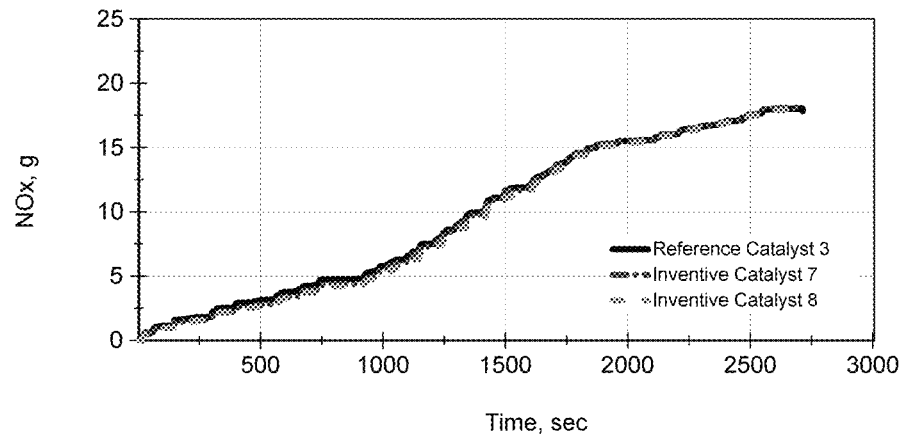
FIG. 19 shows the accumulated mass of $NO_x$ at post catalyst position during the Hot RDE test at engine testing for Reference Catalyst 3, Inventive Catalyst 7, and Inventive Catalyst 8.
Figure 20:
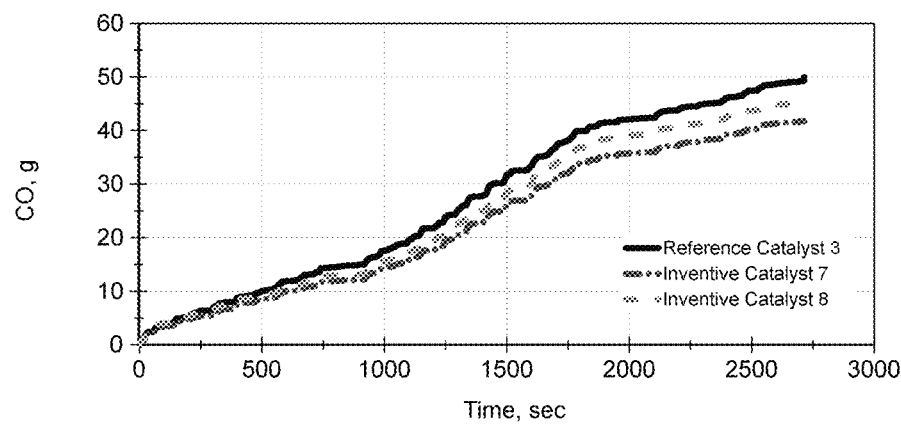
FIG. 20 shows the accumulated mass of CO at post catalyst position during the Hot RDE test at engine testing for Reference Catalyst 3, Inventive Catalyst 7, and Inventive Catalyst 8.
Figure 21:
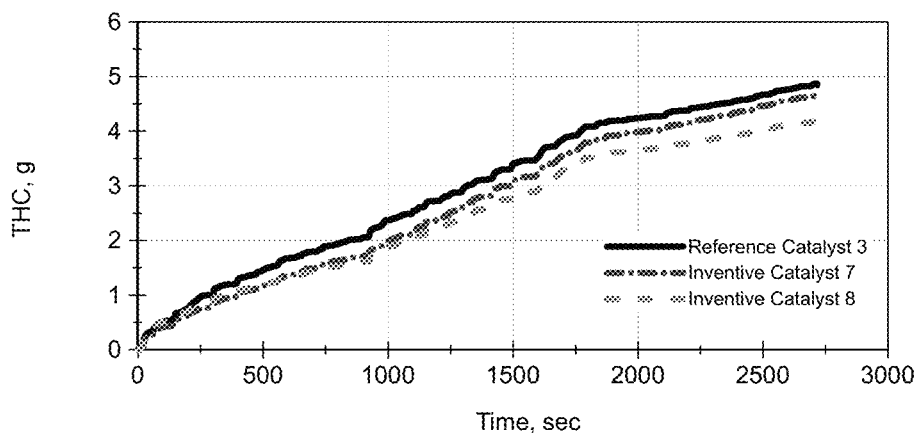
FIG. 21 shows the accumulated mass of THC at post catalyst position during the Hot RDE test at engine testing for Reference Catalyst 3, Inventive Catalyst 7, and Inventive Catalyst 8.

Surprisingly, when Rh total loading increases up to 10 g/ft³, Inventive Catalyst 7 and Inventive Catalyst 8 still show benefits for CO (FIG. 20) and THC (FIG. 21) emission control comparing to Reference Catalyst 3 but having equivalent $NO_x$ (FIG. 19) emission to the Reference Catalyst 3.

Example 5: Cold RDE Test in Engine Testing

All catalysts were engine bench aged for 100 hours with a stoic/fuel cut aging cycle, targeting a peak catalyst bed temperature of 1000° C. The catalysts were tested using a 2.0 L bi-turbo, 4-cylinder, Eu(VI)b-calibrated engine bench dynamometer performing a bespoke OEM designed real-world driving (RDE) cycle comprising acceleration and fuel shut-off conditions representing a cold-start urban, motorway and hot urban speed phases. The cycle length was 2700 seconds from ambient-soaked conditions, reaching an approximate peak catalyst temperature of 700° C., at ~140 km/hr vehicle speed and ~400 kg/hr mass air flow rate. $NO_x$, CO and THC emissions at post catalyst position were measured and accumulated mass of each species was calculated across the cycle. Three runs were conducted on each catalyst formulation, and the averaged value of three runs against time are plotted and shown in the figures below.

Figure 22:
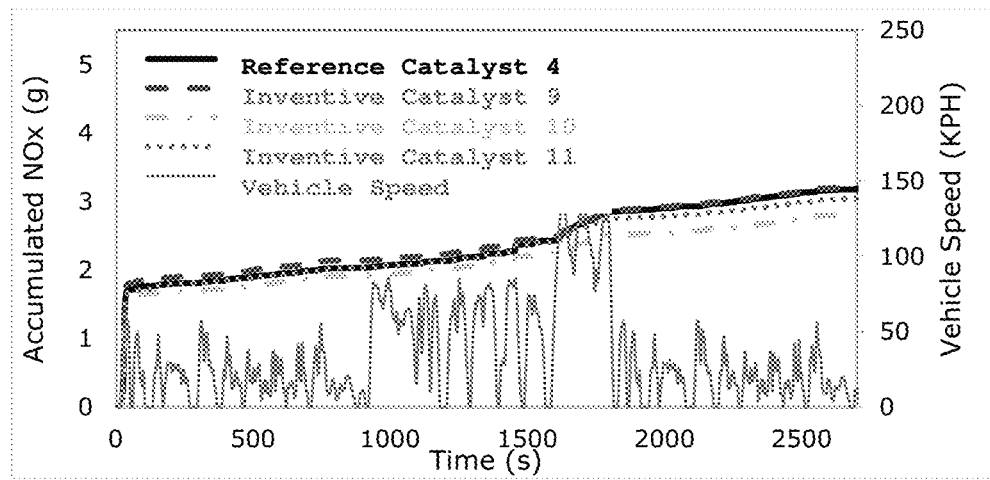
FIG. 22 shows the accumulated mass of $NO_x$ at post catalyst position during Hot the RDE test at engine testing for Reference Catalyst 4 and Inventive Catalysts 9-11.
Figure 23:
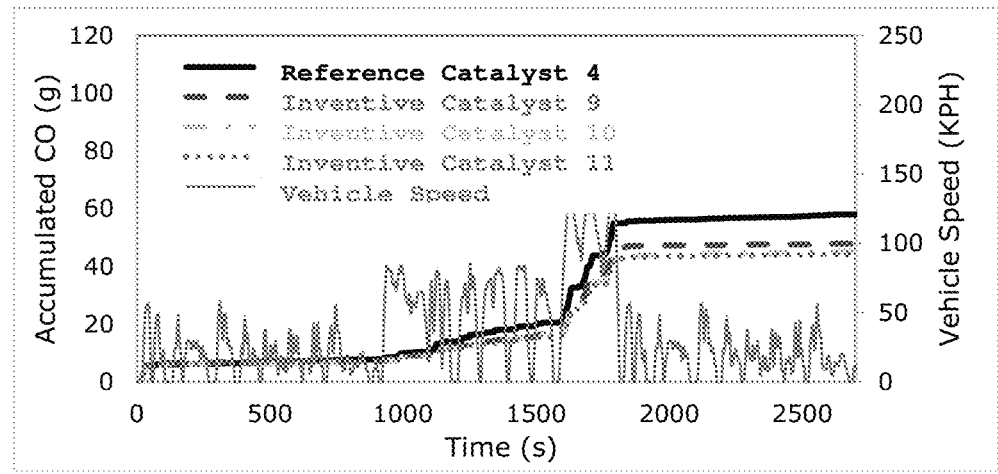
FIG. 23 shows the accumulated mass of CO at post catalyst position during the Hot RDE test at engine testing for Reference Catalyst 4 and Inventive Catalysts 9-11.
Figure 24:
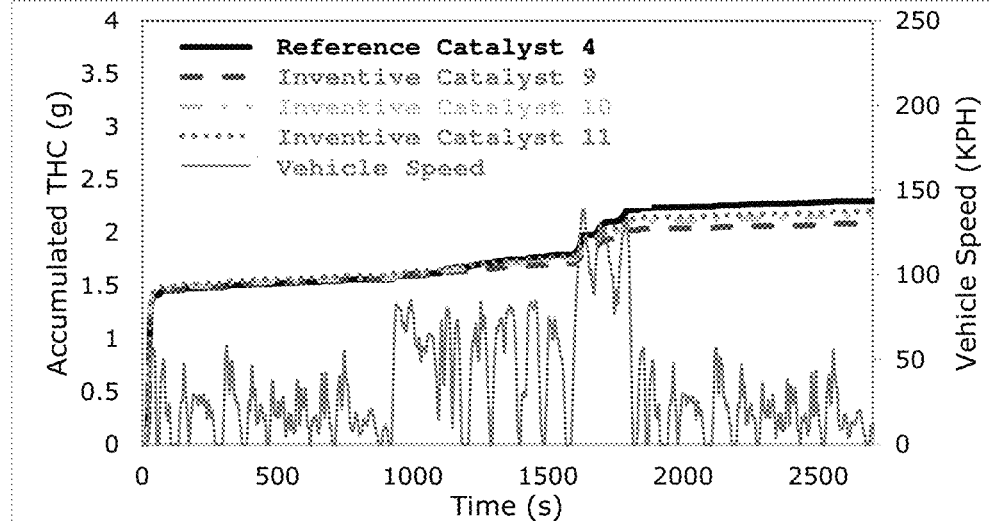
FIG. 24 shows the accumulated mass of THC at post catalyst position during the Hot RDE test at engine testing for Reference Catalyst 4 and Inventive Catalysts 9-11.

FIG. 22 is the $NO_x$ emission of Reference Catalyst 4 and Inventive Catalysts 9-11 during the cold RDE cycle. It is very clear that Inventive Catalyst 10 with zoned configuration having 1% Rh concentrated on La—$Al_2O_3$ in the rear zone gives the lowest $NO_x$ emissions across the entire cold RDE driving cycle. Other formulations, such as Inventive Catalyst 9 with homogeneous distribution of 1% Rh concentrated on La—$Al_2O_3$ in top layer or Inventive Catalyst 11 with zoned configuration but having 1% Rh concentrated on CZO in the rear zone, appear to be equivalent to the Reference Catalyst 4. CO and THC emission are shown in FIG. 23 and FIG. 24, respectively. Although the ranking is slightly different, all Rh partitioned variants is better than the reference for either CO or THC emission control.

Example 6: WLTC Test in Engine Testing

All catalysts were engine bench aged for 100 hours with a stoic/fuel cut aging cycle, targeting a peak catalyst bed temperature of 1000° C. The catalysts were tested using a 2.0 L bi-turbo, 4-cylinder, Eu(VI)b-calibrated engine bench dynamometer performing a standard World Harmonized Light-Duty Test Cycle (WLTC) which comprises acceleration and fuel shut-off conditions representing urban, rural, highway and motorway speed phases. The cycle length was 1800 seconds from ambient-soaked conditions, reaching an approximate peak catalyst temperature of 600° C., at ~130 km/h engine speed and ~200 kg/h mass air flow rate. $NO_x$, CO and THC emissions at post catalyst position were measured and accumulated mass of each species was calculated across the cycle. Three runs were conducted on each catalyst formulation, and the averaged value of three runs against time are plotted and shown in the figures below.

Figure 25:
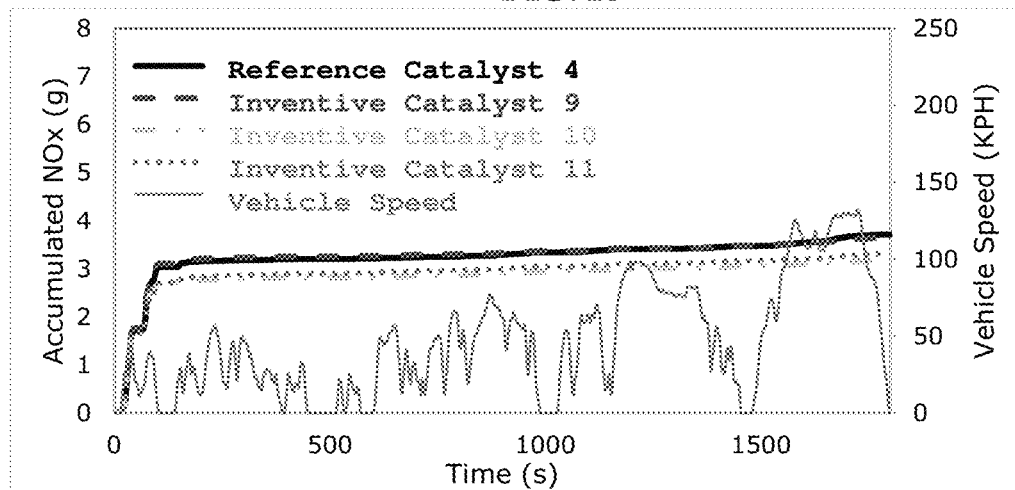
FIG. 25 shows the accumulated mass of $NO_x$ at post catalyst position during the WLTC test at engine testing for Reference Catalyst 4 and Inventive Catalysts 9-11.
Figure 26:
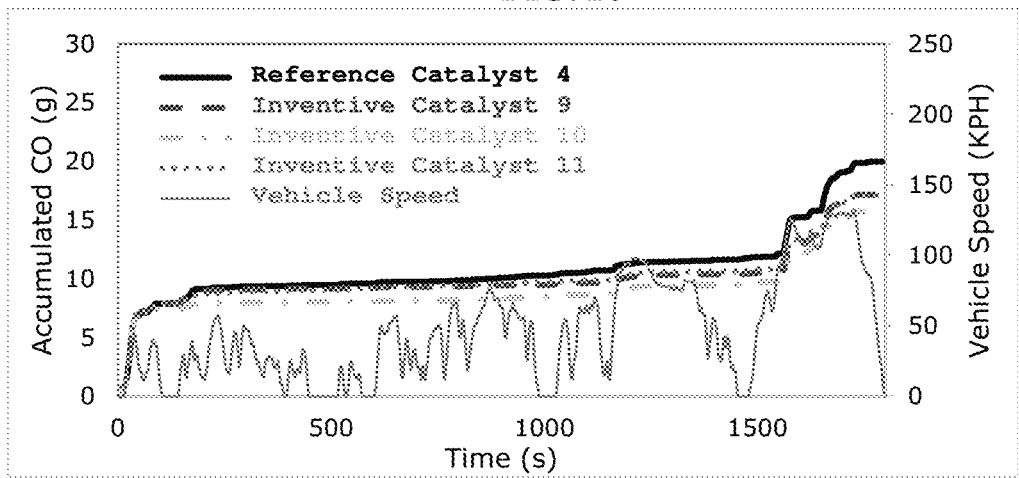
FIG. 26 shows the accumulated mass of CO at post catalyst position during the WLTC test at engine testing for Reference Catalyst 4 and Inventive Catalysts 9-11.
Figure 27:
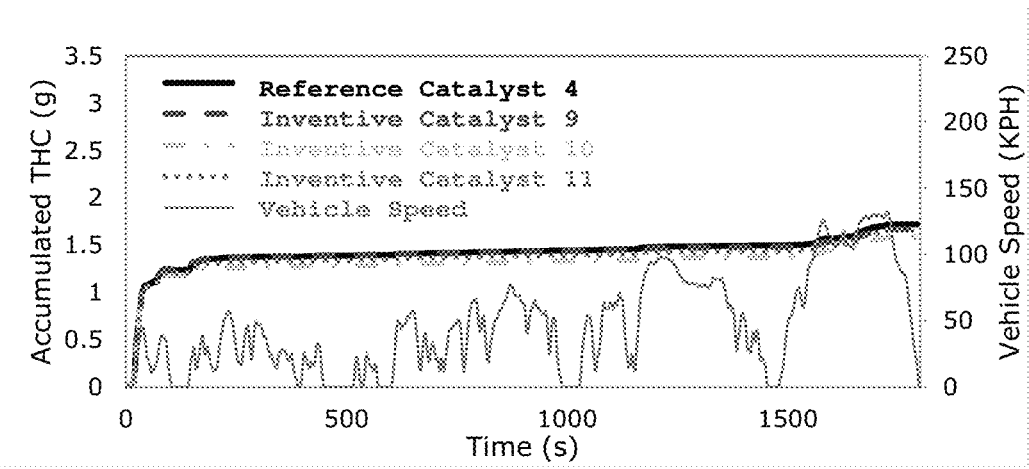
FIG. 27 shows the accumulated mass of THC at post catalyst position during the WLTC test at engine testing for Reference Catalyst 4 and Inventive Catalysts 9-11.

FIG. 25 is the $NO_x$ emission of Reference Catalyst 4 and Inventive Catalysts 9-11 during the WLTC cycle. Inventive Catalyst 10 (zoned configuration with 1% Rh concentrated on La—$Al_2O_3$ in the rear zone) and Inventive Catalyst 11 (zoned configuration but having 1% Rh concentrated on CZO in the rear zone) are equally good, both give the lowest $NO_x$ emissions across the entire WLTC driving cycle. Homogeneous distribution of 1% Rh concentrated on La—$Al_2O_3$ in Inventive Catalyst 9 appears to be equivalent to the Reference Catalyst 4. CO and THC emission are shown in FIG. 26 and FIG. 27, respectively. Although the ranking is slightly different, all Rh partitioned variants is better than the reference for either CO or THC emission control.

Example 7: Vehicle Testing

The bench aged samples of Inventive Catalysts 12 and 13, and Comparative Catalyst 5 were tested over vehicle of 1.5-liter engine with Worldwide Light Duty Testing Procedure (WLTP). The bench aging was under 6.1-L engine in the same run for 150 hrs with four mode aging cycle, with peak bed temperature at about 980° C. in the catalysts. Results of vehicle exhaust diluted bag data over bench aged parts are shown in Table 4. Inventive Catalysts 12 and 13 of the present invention presents superior activities on THC and NMHC emission control, compared with Comparative Catalyst 5. (e.g., see the THC and NMHC performances improved with around 11%, and 12% over Comparative Catalyst 5, respectively).

TABLE 4

Results of Emissions by Vehicle Diluted Bag Data

| | Exhaust Emissions (mg/km) | | | |
|---|---|---|---|---|
| | THC | NMHC | CO/10 | $NO_x$ |
| Comparative Catalyst 5 | 42.8 | 31.4 | 47.5 | 37.9 |
| Inventive Catalyst 12 | 38.2 | 27.7 | 40.6 | 47.2 |
| Inventive Catalyst 13 | 37.9 | 27.5 | 40.2 | 38.1 |

Example 8: Light Off Performances Test in Engine Testing

The bench aged Inventive Catalysts 12 and 13, and Comparative Catalyst 5 were tested separately over a gasoline engine. The light off performance is a typical condition with the exhaust gas flow rate of 80 kg/hr, temperature ramp is 30° C./min, the lambda of Air and Fuel Ratio (AFR) at 14.45. the conversion of THC and CO were calculated from comparing the concentration of the feed gas and the gas at the outlets of the catalysts. Before the engine light off testing, Inventive Catalysts 12 and 13, and Comparative Catalyst 5 were bench aged for 150 hrs. The bench aging is under 6.1-L engine in the same run for 150 hrs with four mode aging cycle, with peak bed temperature at about 980° C. in the catalysts.

The HC, CO, and $NO_x$ $T_{50}$ light off temperatures ($T_{50}$ is the temperature when the conversion reaching 50%) of Inventive Catalysts 12 and 13, and Comparative Catalyst 5 are shown in Table 5. The data indicate that Inventive Catalysts 12 and 13 showed improved light off performances for HC, CO and $NO_x$. Compared with Comparative Catalyst 5 (e.g., $T_{50}$ of $NO_x$, CO, HC over Inventive Catalyst 13 was lowered by 13° C., 11° C., 8° C. respectively).

TABLE 5

Engine Bench Light-Off Test Results

| Catalysts | Rh local concentration | Total Rh loading (g/ft³) | $T_{50}$ (° C.) $NO_x$ | $T_{50}$ (° C.) CO | $T_{50}$ (° C.) HC |
|---|---|---|---|---|---|
| Comparative Catalyst 5 | 0.15% | 4 | 311 | 308 | 319 |
| Inventive Catalyst 12 | 0.31% | 4 | 306 | 304 | 316 |
| Inventive Catalyst 13 | 0.62% | 4 | 298 | 297 | 311 |

The foregoing detailed description has been provided by way of explanation and illustration and is not intended to limit the scope of the appended claims. Many variations in the presently preferred embodiments illustrated herein will be apparent to one of ordinary skill in the art and remain within the scope of the appended claims and their equivalents.

The invention claimed is:

1. A catalyst article for treating exhaust gas comprising:
a substrate comprising an inlet end and an outlet end with an axial length L;
a first catalytic region comprising support material particles;
at least some of the support material particles are rhodium-supporting support material particles having rhodium supported thereon at a concentration of from 0.001 to 3.5 wt. %, based on the weight of the rhodium-supporting support material particle;
the rhodium is present at a loading of up to 20 g/ft³ relative to the first catalytic region; and
wherein at least some of the support material particles are non-supporting support material particles having essentially no rhodium supported thereon.

2. The catalyst article of claim 1, wherein at least some of the support material particles are non-supporting support material particles having no rhodium supported thereon.

3. The catalyst article of claim 1, wherein from 5 to 80% of the support material particles in the first catalyst region are rhodium-supporting support material particles.

4. The catalyst article of claim 1, wherein the support material particles comprise alumina and/or a ceria-zirconia mixed oxide.

5. The catalyst article of claim 4, wherein the alumina and/or a ceria-zirconia mixed oxide is doped.

6. The catalyst article of claim 4, wherein the support material particles comprise a ceria-zirconia mixed oxide; and
wherein when a cross section of the first catalyst region of the catalyst article is subjected to area analysis by FE-EPMA under conditions of pixel (section) size of 0.34 μm×0.34 μm and number of measured pixels (sections) of 256×256, a characteristic X-ray intensity (α: cps) of the zirconium (Zr) and a characteristic X-ray intensity (β: cps) of the rhodium (Rh) are measured for each pixel, and the Pearson correlation coefficient calculated using the resulting α and β in each pixel is designated as $R_{Zr/Rh}$, then the value of $R_{Zr/Rh}$ is from 0.15 to 0.48.

7. The catalyst article of claim 1, wherein the rhodium is present at a loading of from 1 to 20 g/ft³ relative to the first catalytic region.

8. The catalyst article of claim 1, further comprising a second catalytic region.

9. The catalytic article of claim 8, wherein the second catalytic region comprises a second PGM component.

10. The catalytic article of claim 9, wherein the second catalytic region further comprises a second OSC material and/or a second inorganic oxide.

11. The catalytic article of claim 8, further comprising a third catalytic region.

12. The catalytic article of claim 11, wherein the third catalytic region comprises a third PGM component.

13. The catalytic article of claim 12, wherein the third catalytic region further comprises a third OSC material and/or a third inorganic oxide.

14. The catalyst article of any preceding claim, wherein the first catalyst region further comprises platinum and/or palladium.

15. The catalyst article of claim 1, wherein the substrate comprises a flow-through substrate.

16. An emission treatment system comprising the catalyst article of claim 1.

17. A method of treating an exhaust gas, the method comprising:
providing the catalyst article of claim 1; and
contacting the catalyst article with an exhaust gas.

18. A method of manufacturing a catalyst article, the method comprising:
providing rhodium-supporting support material particles having rhodium supported thereon at a concentration of from 0.001 to 3.5 wt. %, based on the weight of the rhodium-supporting support material particle;
providing non-supporting support material particles having essentially no rhodium supported thereon;
forming a washcoat comprising the rhodium-supporting support material particles and the non-supporting support material particles; and
coating a substrate with the washcoat to provide a catalyst article wherein the rhodium is present at a loading of up to 20 g/ft$^3$ relative to the substrate.

19. The method of claim 18, wherein providing rhodium-supporting support material particles comprises supporting rhodium on support material particles using incipient wetness impregnation.

20. The method of claim 19, wherein providing rhodium-supporting support material particles further comprises drying and calcining the rhodium-supporting support material particles.

* * * * *